Figure 1:
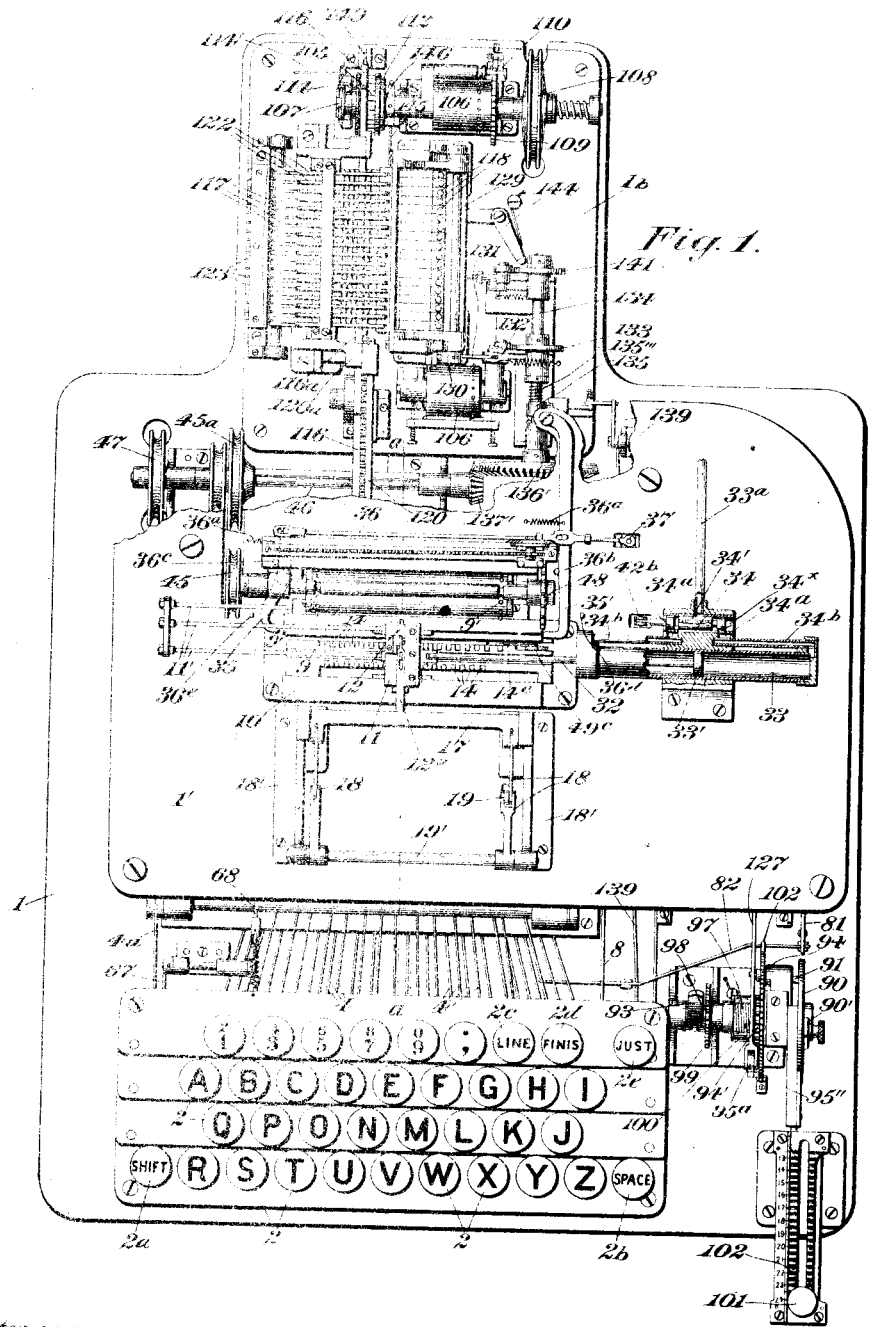

C. T. MOORE.
MACHINE FOR MAKING COMPOSING RIBBONS FOR AUTOMATIC TYPOGRAPHIC MACHINES.
APPLICATION FILED NOV. 7, 1902.

1,136,081.

Patented Apr. 20, 1915.
14 SHEETS—SHEET 1.

Witnesses:
H. C. Workman
J. Green

Inventor:
Charles T. Moore
By Knight Bros
Attorneys

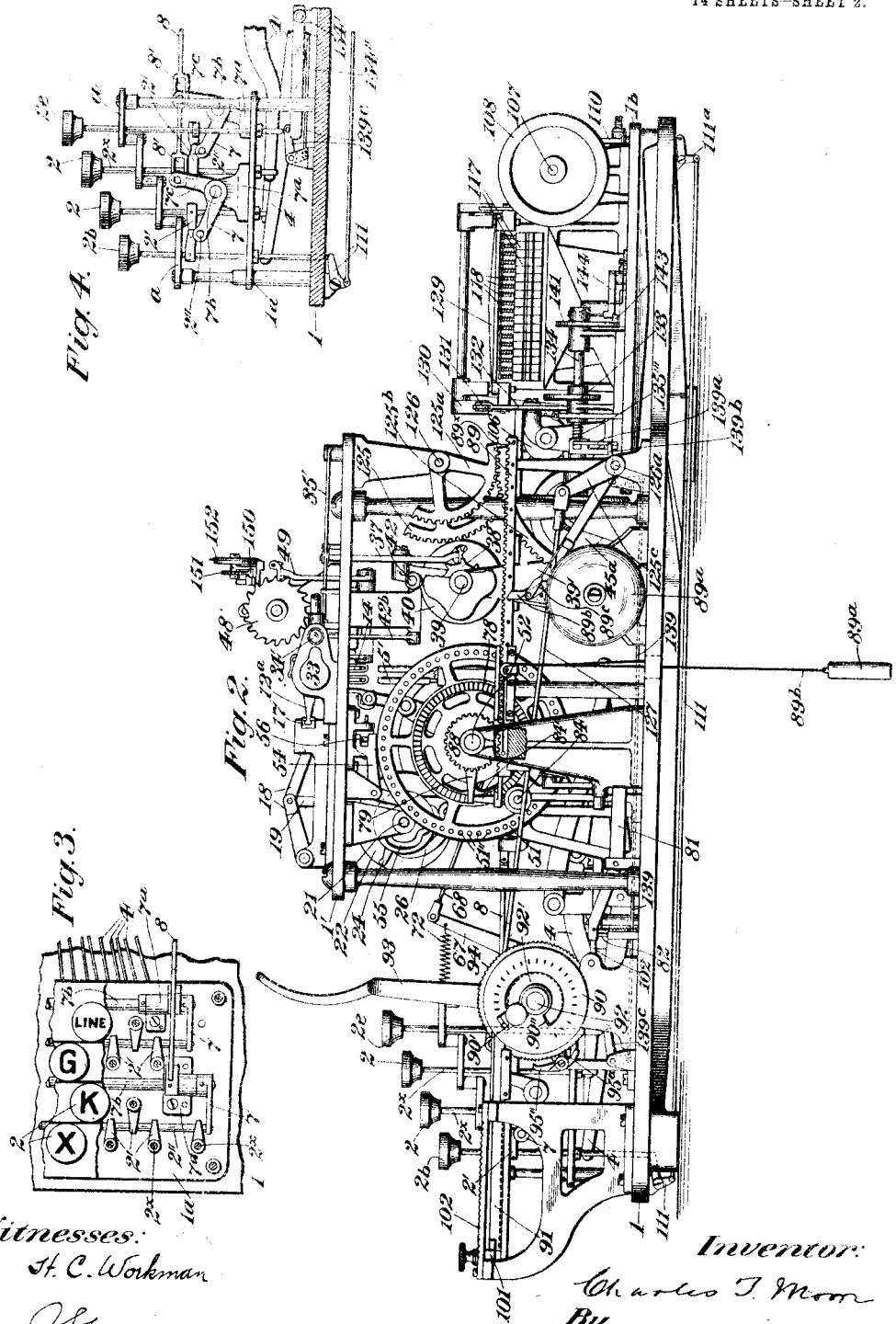

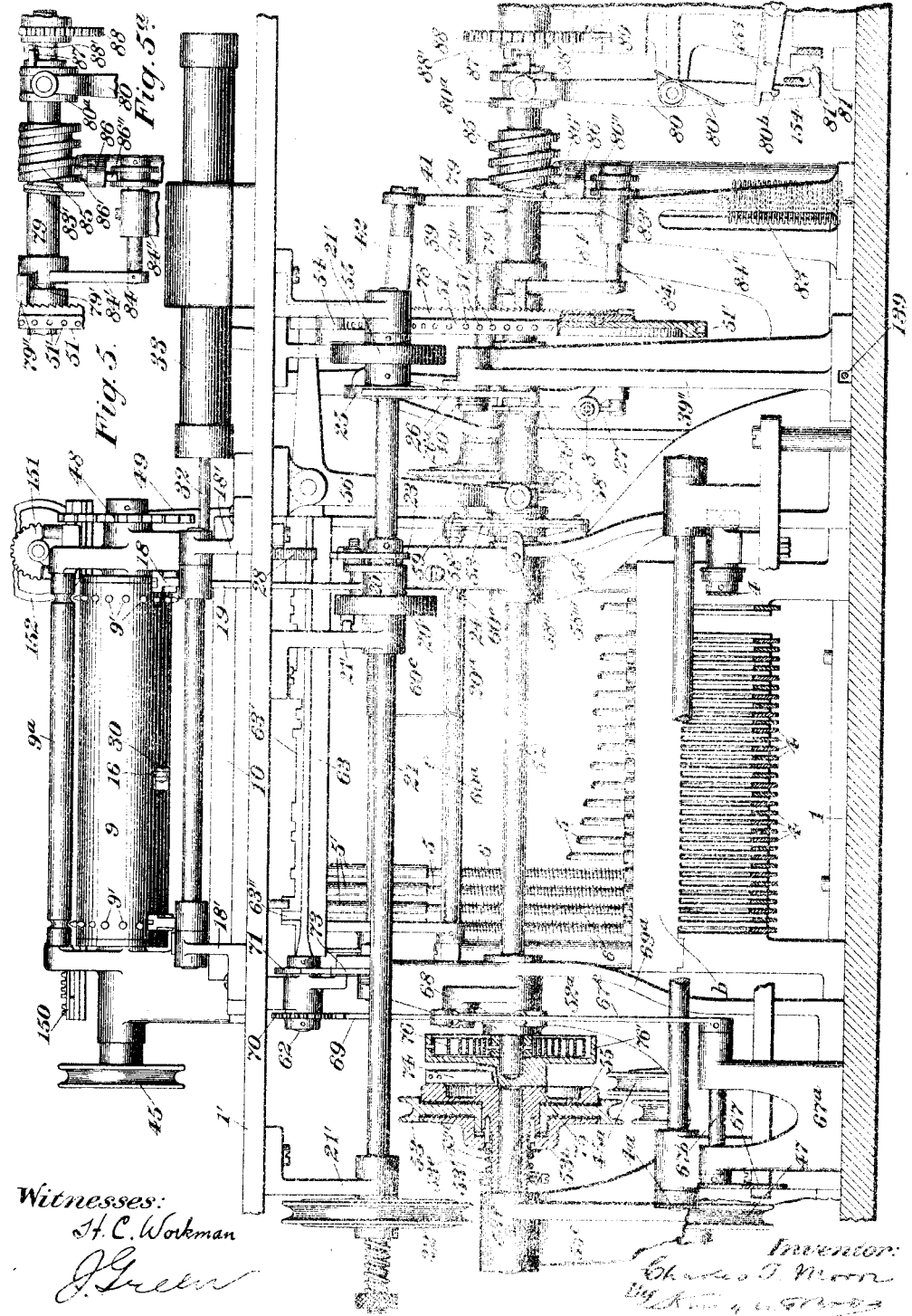

C. T. MOORE.
MACHINE FOR MAKING COMPOSING RIBBONS FOR AUTOMATIC TYPOGRAPHIC MACHINES.
APPLICATION FILED NOV. 7, 1902.
1,136,081.
Patented Apr. 20, 1915.
14 SHEETS—SHEET 4.
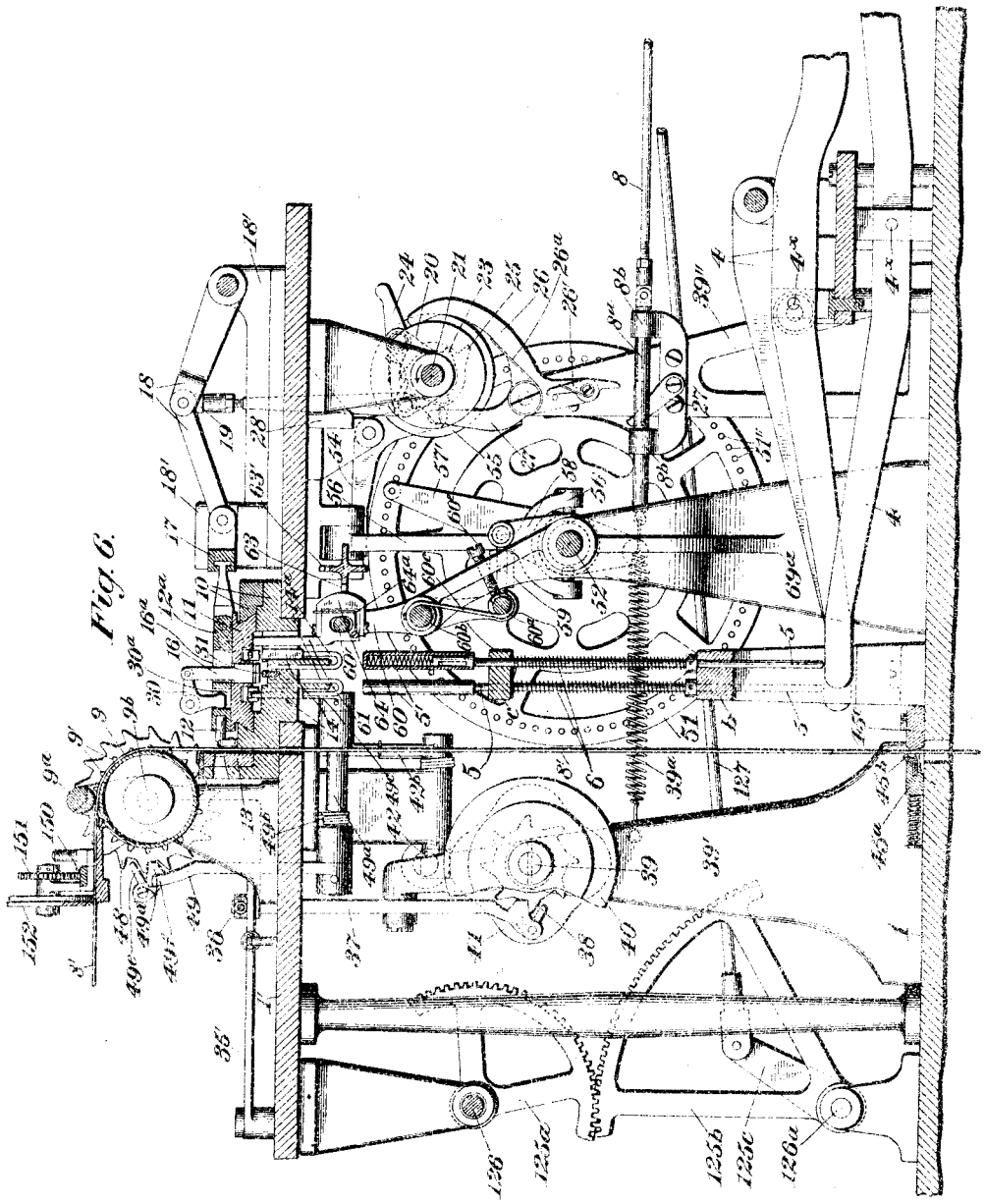
Witnesses:
H. C. Workman
Inventor:
Charles T. Moore
By
Attorneys

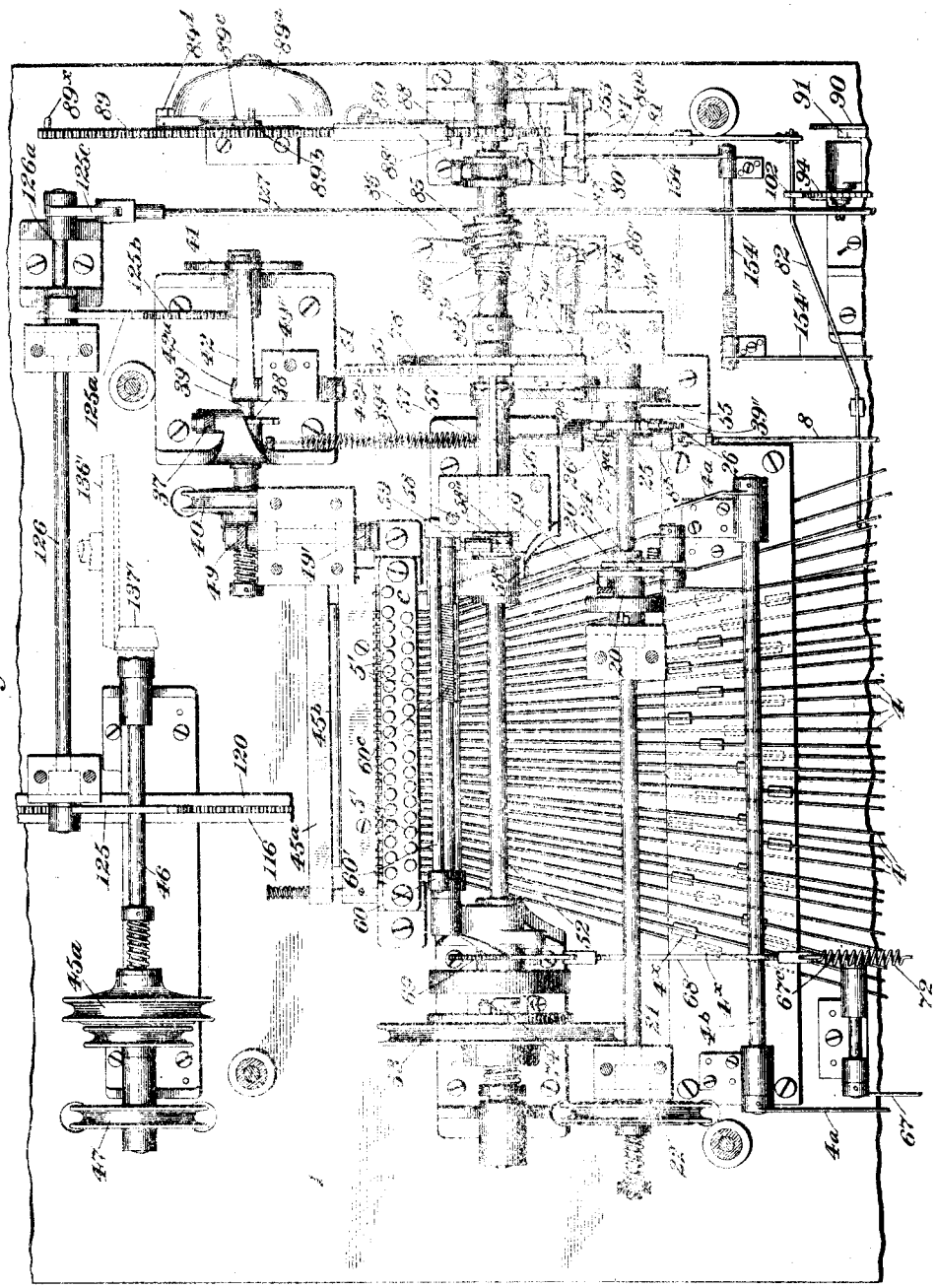

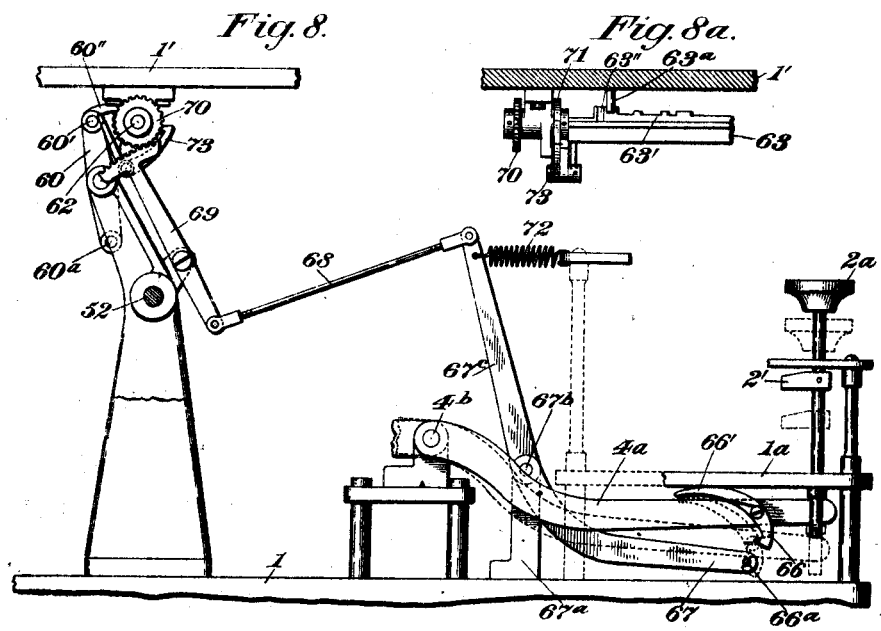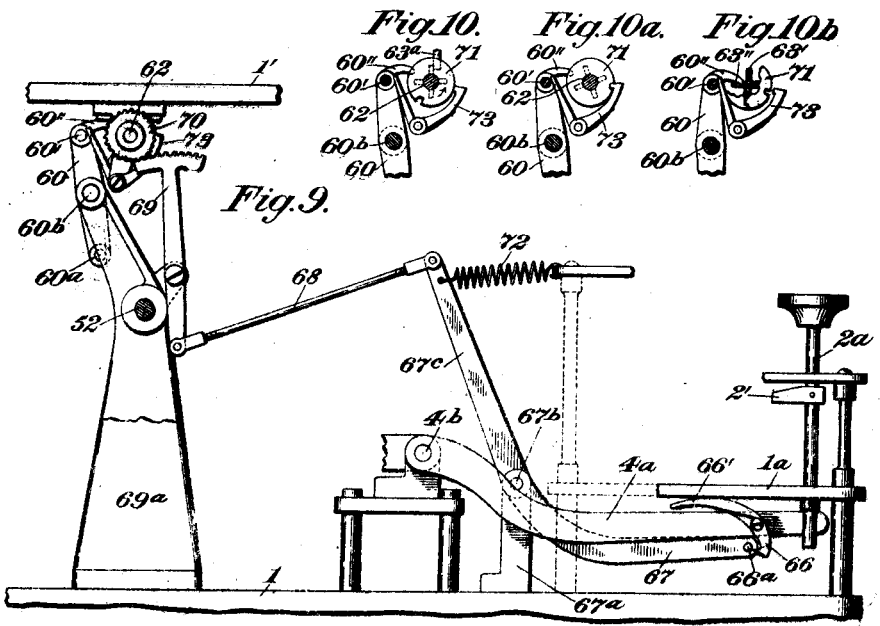

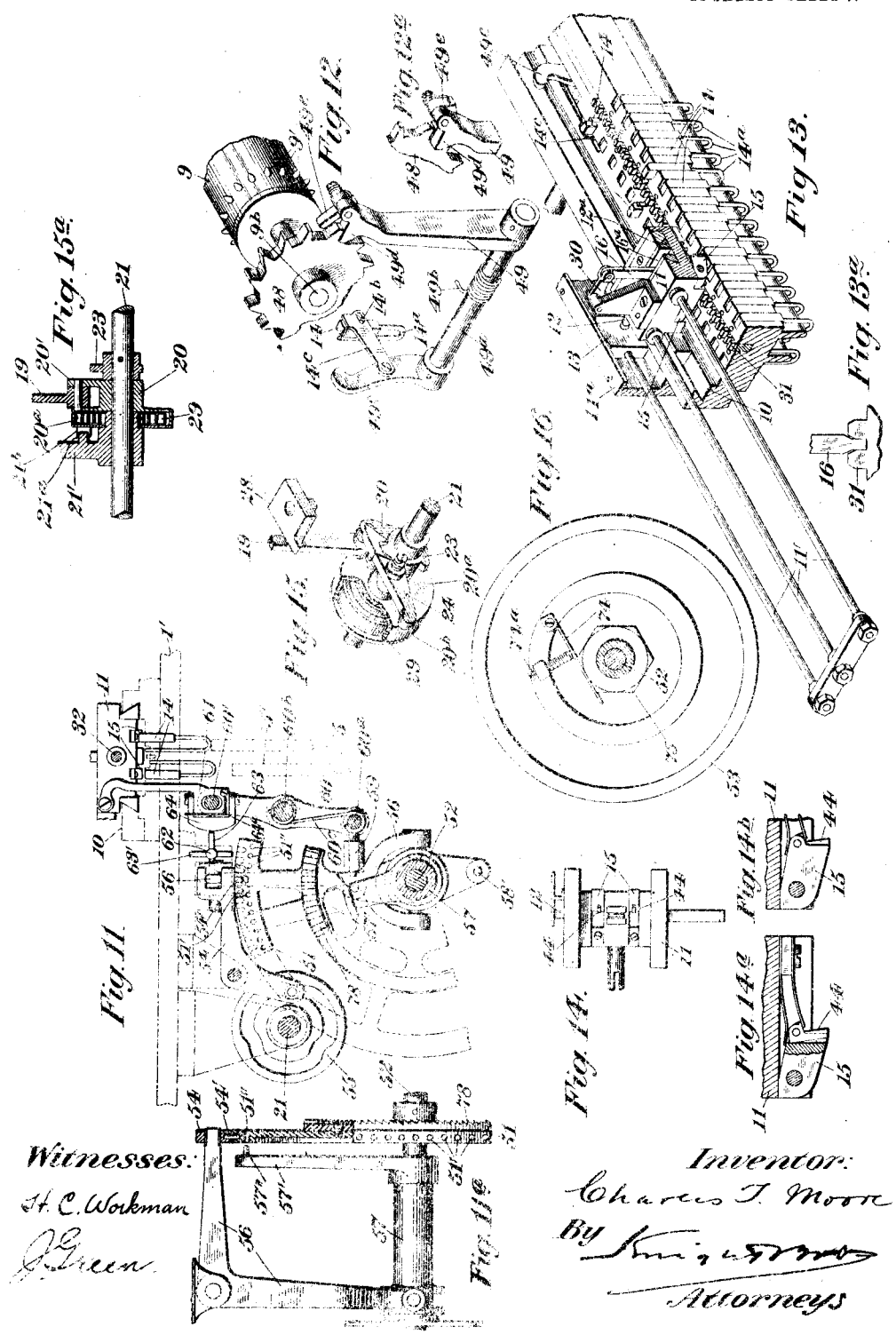

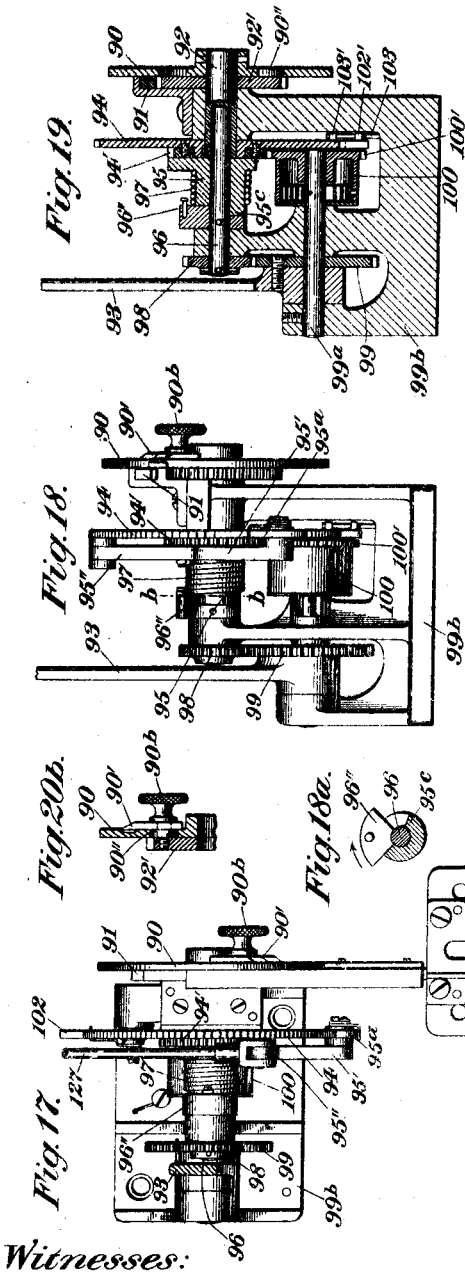

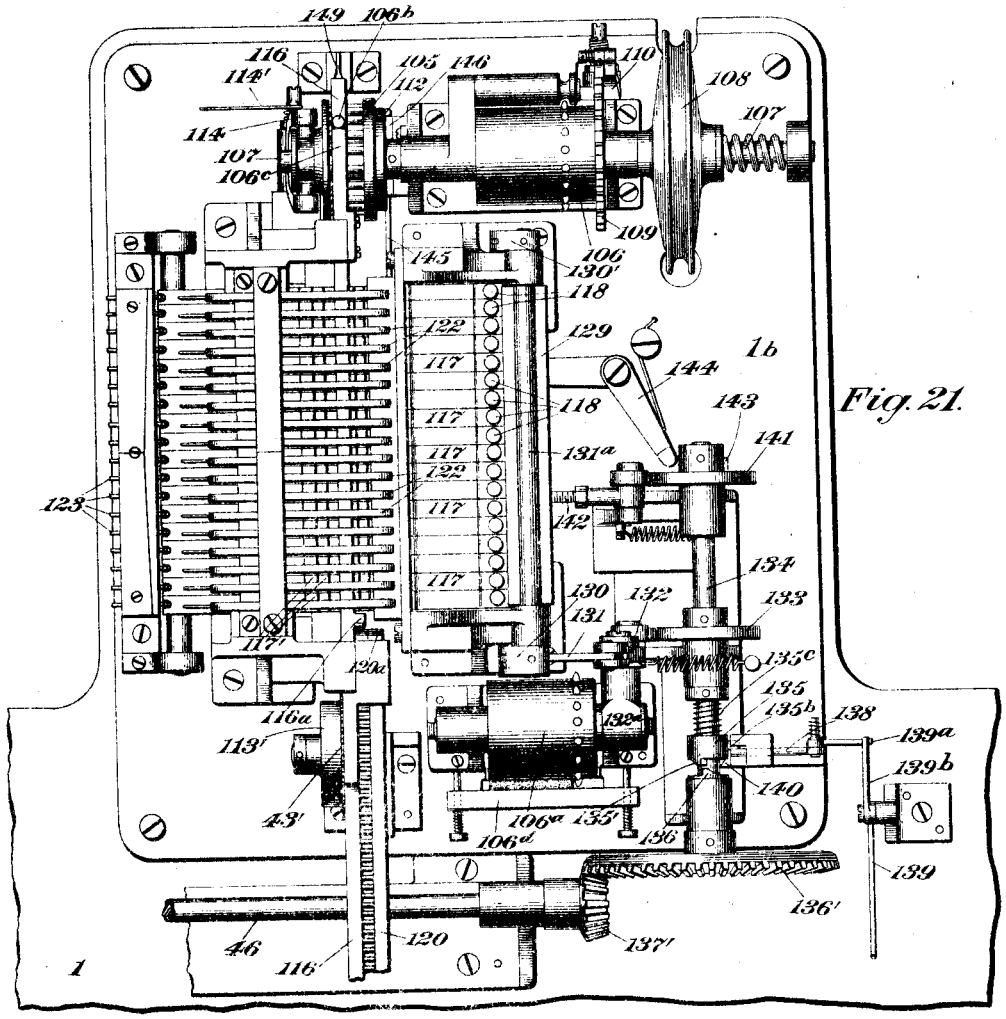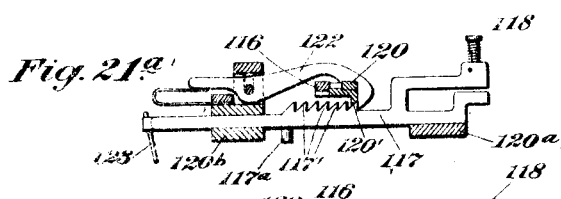

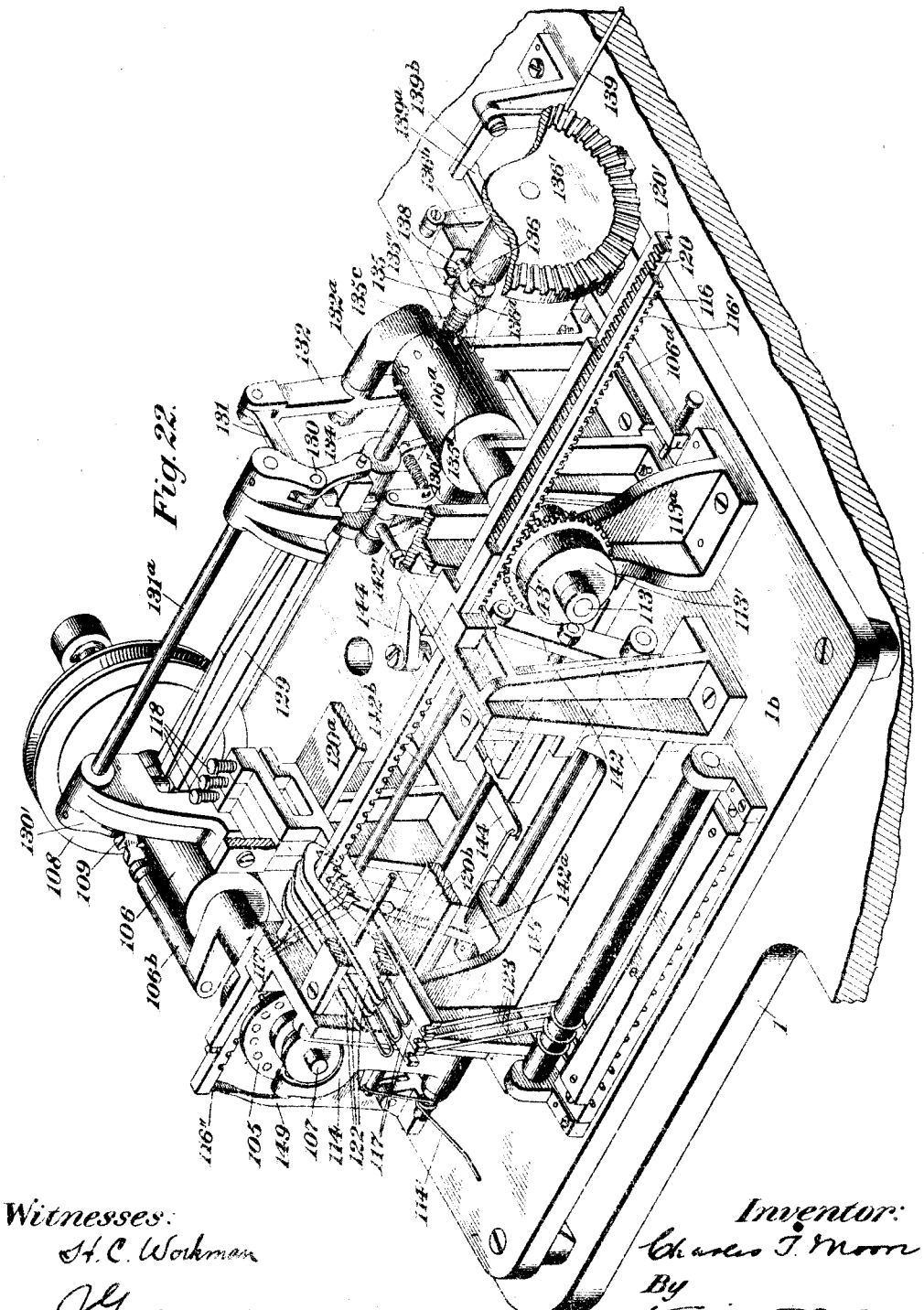

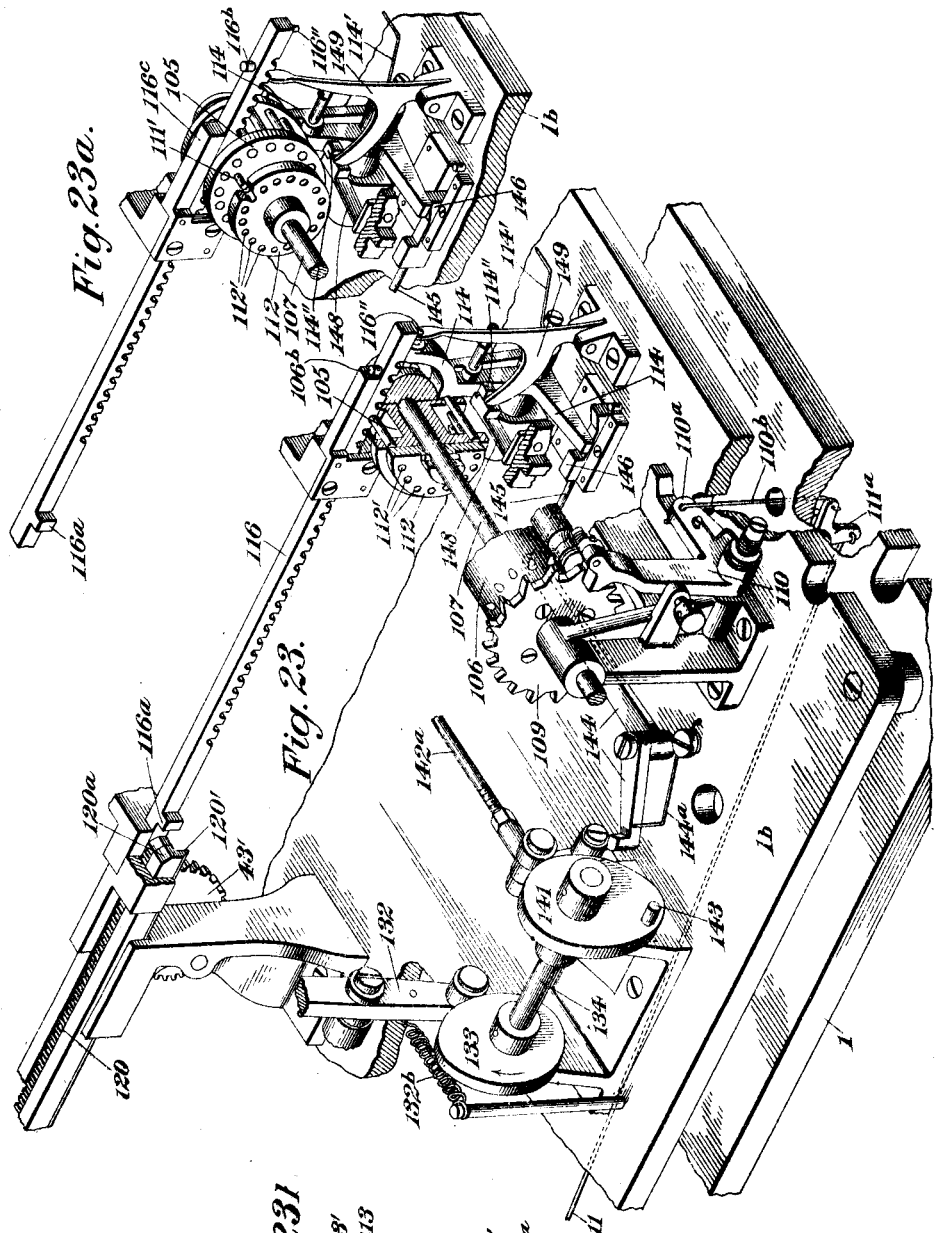

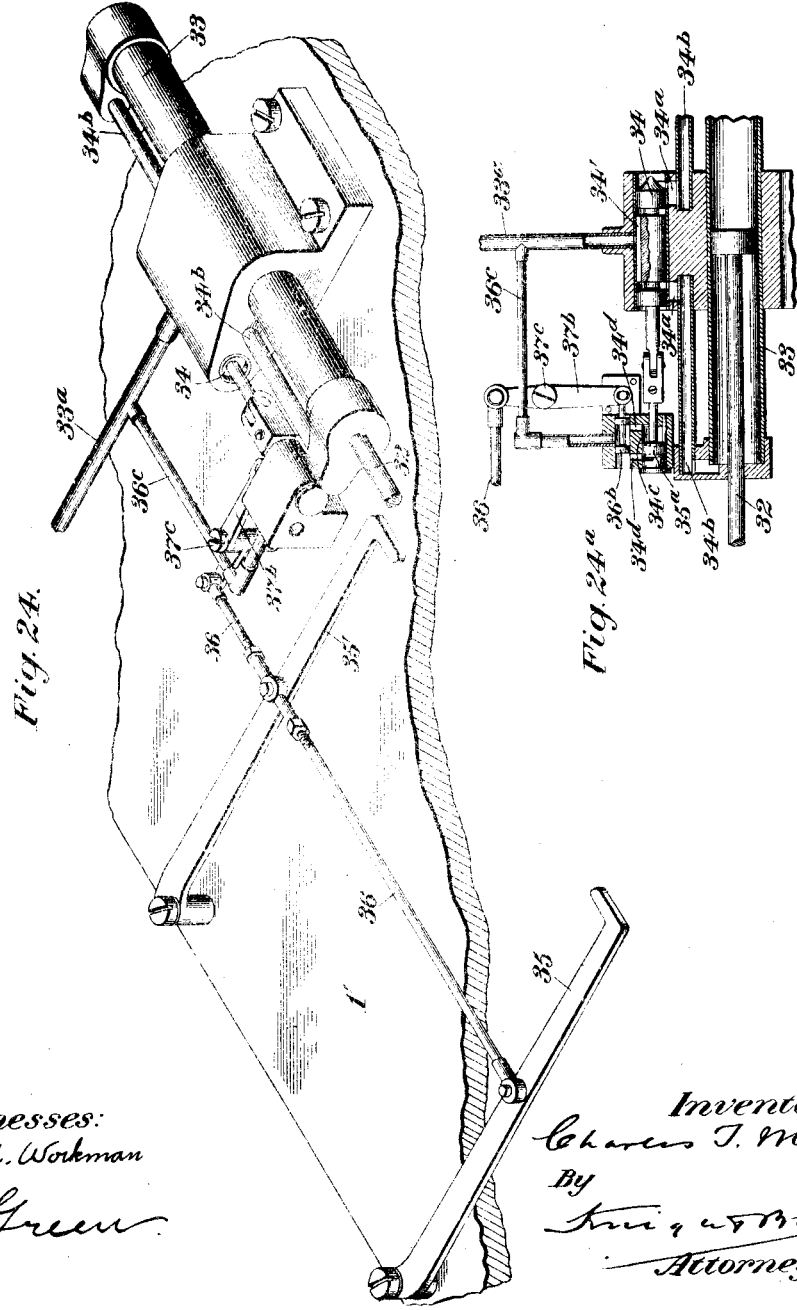
C. T. MOORE.
MACHINE FOR MAKING COMPOSING RIBBONS FOR AUTOMATIC TYPOGRAPHIC MACHINES.
APPLICATION FILED NOV. 7, 1902.
1,136,081.
Patented Apr. 20, 1915.
14 SHEETS—SHEET 12.

C. T. MOORE.
MACHINE FOR MAKING COMPOSING RIBBONS FOR AUTOMATIC TYPOGRAPHIC MACHINES.
APPLICATION FILED NOV. 7, 1902.
1,136,081.
Patented Apr. 20, 1915.
14 SHEETS—SHEET 13.
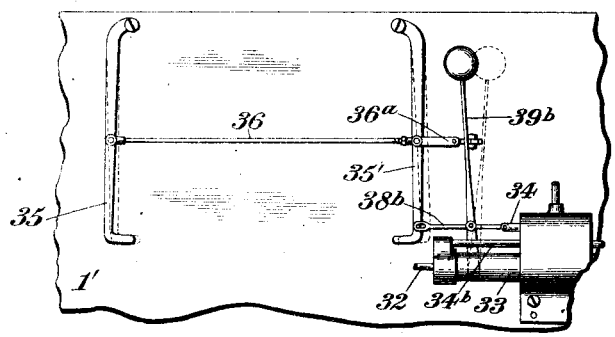
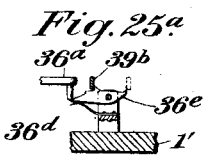
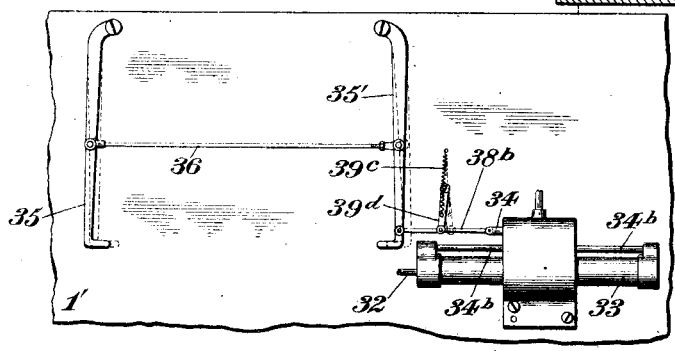
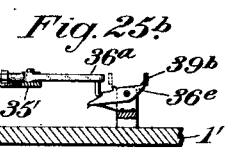
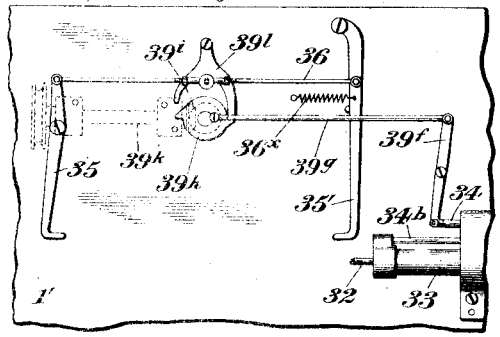
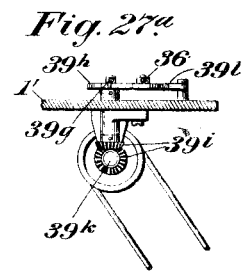

C. T. MOORE.
MACHINE FOR MAKING COMPOSING RIBBONS FOR AUTOMATIC TYPOGRAPHIC MACHINES.
APPLICATION FILED NOV. 7, 1902.
1,136,081.
Patented Apr. 20, 1915.
14 SHEETS—SHEET 14.
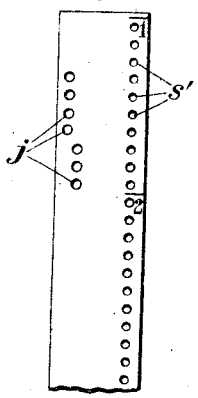
*Fig. 29*
*Fig. 29ᵃ*
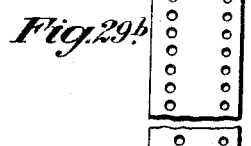
*Fig. 29ᵇ*
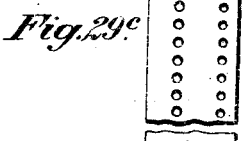
*Fig. 29ᶜ*
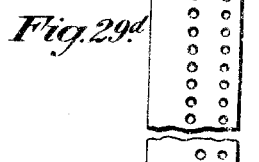
*Fig. 29ᵈ*
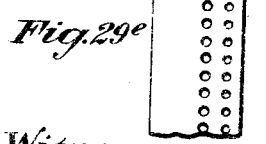
*Fig. 29ᵉ*
Witnesses:
H. C. Workman
J. Green
Inventor:
Charles T. Moore
By
Attorneys

UNITED STATES PATENT OFFICE.

CHARLES T. MOORE, OF WASHINGTON, DISTRICT OF COLUMBIA, ASSIGNOR, BY MESNE ASSIGNMENTS, TO JAMES G. COFFIN, TRUSTEE.

MACHINE FOR MAKING COMPOSING-RIBBONS FOR AUTOMATIC TYPOGRAPHIC MACHINES.

1,136,081.  Specification of Letters Patent.  Patented Apr. 20, 1915.

Application filed November 7, 1902. Serial No. 130,459.

*To all whom it may concern:*

Be it known that I, CHARLES T. MOORE, a citizen of the United States, residing at Washington, in the District of Columbia, have invented a new and useful Machine for Making Composing-Ribbons for Automatic Typographic Machines, of which the following is a specification.

My invention relates to machines for making controllers for automatic typographic machines in which the various typographic functions and operations are controlled by means of a controller bearing marks which represent these typographic functions. The marks on the controller represent type characters, word-spaces, shift marks, justification marks, etc. In passing through the typographic machine these marks on the controller set in motion the mechanisms corresponding thereto, causing the machine to reproduce the matter represented on the controller.

An object of my invention is to produce a composing ribbon or controller capable of controlling a proper typographic machine in automatically selecting the letters and characters used in composition and by an auxiliary representation on said controller to automatically render operative certain mechanism of the typographic machine to change from one style of character to another, and by certain other representations upon said controller to cause the mechanism of the typographic machine used in connection with said controller to perform certain additional functions such as alinement, paragraphing, etc., which are more fully set forth hereafter.

One object of the invention is to provide novel mechanism for automatically justifying the line without the mental intervention of the machine operator and marking the controller in accordance therewith.

Another object of my invention is to provide novel justifying mechanism which is exceedingly simple in construction and operation, and automatic in its computation of justification.

An additional object of my invention is to provide a controller adapted to control a typographic machine capable of recognizing in succession a plurality of typographic representations on a single transverse line of the controller.

A further object is to produce simultaneously with the composing or type character ribbon a separate controller or ribbon which will automatically bring into operation in the typographic machine mechanisms for varying the word spaces in a line for the purpose of justification. This ribbon will be referred to herein as the justification ribbon.

Further objects of the invention will in part be set forth hereinafter and in part will be obvious to those skilled in the art.

The invention consists in the novel parts, constructions, arrangements, improvements and combinations, herein shown and described.

The present form of my improved apparatus for making controllers as embodied in the described and illustrated form is especially designed for use in connection with a typographic machine of the general type disclosed in my application for Letters Patent Serial No. 76,783 (renewal Serial No. 616,023) filed September 27th, 1901.

The accompanying drawings referred to herein and constituting a part hereof, illustrate one embodiment of the invention and with the specification serve to explain the principles thereof.

Of the drawings: Figure 1 is a plan view of the machine, part of the pressure cylinder being shown in section. Fig. 2 is a side elevation viewed from the right of Fig. 1. Figs. 3 and 4 are detail views, in broken plan and side elevation respectively, of a portion of the keyboard. Fig. 5 is a transverse vertical section on an enlarged scale, taken in rear of the keyboard, and showing parts in section. Fig. 5ª is a detail of the unit storing mechanism. Fig. 6 is a vertical sectional view of Fig. 5. Fig. 7 is a plan view of part of the machine with the top parts removed. Figs. 8 to 10ᵇ inclusive are detail views illustrating the shift mechanism. Figs. 11 and 11ª are detail views illustrating the unit wheel. Figs. 12 and 12ª are detail perspective views showing the ribbon feed-roll escapement. Fig. 13 is a detail view in perspective, showing the perforator carriage and its ways. Fig. 13ª is a detail showing the rack and bolt for positioning the carriage. Fig. 14 is a view of the underneath side of the carriage. Figs. 14ª and 14ᵇ are enlarged detail views, showing the construction of the carriage stop-pawls. Figs. 15 and 15ª are detail perspective and sectional views of the carriage toggle actuating mechanism. Fig. 16 is a view of the winding mechanism for the spring case on the unit-wheel shaft. Figs. 17, 18, 18ª and 19 are detail views showing the justifying lever mechanism. Fig. 20 is a detail showing a side elevation of the justifying lever mechanism. Fig. 20ª is a detail of the release and locking mechanism for the unit ratchet wheel 94. Fig. 20ᵇ is a sectional detail of the locking device for the line adjusting device. Fig. 20ᶜ is a sectional detail view of the stop line-gauge. Fig. 21 is a plan view of the justification mechanism on an enlarged scale. Figs. 21ª and 21ᵇ are detail views of one of the justifying slide punches. Figs 21ᶜ and 21ᵈ are details of the clutch mechanism for putting the justification mechanism in operation. Fig. 22 is a perspective of the justification mechanism. Figs. 23 and 23ª are detail perspective views of part of the justification mechanism with other parts removed or broken away. Fig. 23ᵇ is a detail view, partly in section, of the return mechanism for the word-space rack. Figs. 24 to 27ª inclusive, are detail views, showing the motive means for the perforator carriage with modifications thereof. Fig. 28 illustrates a portion of a strip or ribbon as marked by the machine to control an automatic typographic apparatus to produce the sentence: "The perforations shown here will govern the printing machine so it will print this sentence," without justifying the same. Fig. 29 shows that portion of the justification strip marked with the appropriate justification marks to govern the typographic machine so that it will justify the first line of the above sentence. Figs. 29ª to 29ᵉ inclusive are portions of the justification strip illustrating the action of the justification mechanism.

Referring by way of example to the accompanying drawing, illustrating by way of example one embodiment of the invention, I have, for convenience and ease of understanding, divided the text into parts entitled as different parts or mechanisms of the general machine. It will be understood, however, that such arrangement is not restrictive, nor is it definitive save for convenience and guidance in understanding the specification.

*Keyboard mechanism.*—The embodied form of machine is mounted upon a main base plate 1. At the front of said base plate is arranged a keyboard, as clearly seen in Fig. 1, consisting, in the machine shown in the drawings, of four horizontally arranged rows of keys 2. It will be understood that while four rows of keys are shown in the drawings, the keys may be arranged in any desired or convenient number of rows, it being necessary only to provide them with the coöperating connections with the various coöperating mechanisms. These keys represent, as shown the various type characters and punctuation marks used in printing. Certain printing functions are represented by special keys marked "Line," "Shift" and "Space." Upon the depression of any one of the keys, excepting the justification key, mechanism, hereinafter described, is set in motion to mark the ribbon to correspond to the key depressed. The mechanism for accomplishing the above-stated result is as follows: Referring to Figs. 1, 3 and 4, the keys are mounted upon stems $2^x$ guided through apertures in supporting plates $a$ and $1^a$. At their lower ends said key stems are slotted to receive the ends of key levers 4, 4, the key levers being pivoted intermediate their ends at points $4^x$ shown in Fig. 6. At their inner ends said key levers are guided in a comb (see Fig. 5) to engage the lower ends of push-rods 5, said rods being guided through apertures in a suitable bracket $b$ and cross-piece $c$ (see Fig. 6) supported on the main frame of the machine. Said push-rods are surrounded by springs 6 to return them and the key-levers to normal position after said push rods having been projected upwardly by the key-levers 4. At their upper ends said push-rods are provided with spring mounted caps 5', as shown, the purpose of which will be hereinafter described.

*Stop mechanism for carriage.*—In the automatic typographic apparatus with which my present machine is designed to coöperate, or one kind of typographic machine adapted to be controlled by the controller produced by my present machine, the type characters are arranged in a fixed order of sequence upon a progressively moving type-carrier. In such a machine a single perforation or mark may represent a typographic character and the typographic machine can recognize simultaneously all the characters in the composed matter following one after another in the same order as they occur sequentially but not necessarily successively on the type carrier. It is thus possible to place on a single transverse line of the controller all the characters coming one after another so long as they follow along with, that is, do not reverse the order of sequence of the characters on the type carrier of the typographic machine. When, in the matter being represented on the ribbon a letter or character occurs out of the said sequence, automatically acting mechanism causes a new transverse line of marks to be commenced for that letter or character. In other words, my controller making machine automatically arranges the successive character marks constituting the composed matter on the ribbon in transverse lines according to the same sequence in which they are arranged in the typographic machine. It is possible thus to provide a greatly condensed or shortened controller strip. It will be understood, however, that in many of its features, my invention is not limited to such an arrangement of characters. The embodied form of means for accomplishing this are as follows: In top plate 1' of the machine is arranged a guide plate 10 for a transversely reciprocated carriage 11 (see Figs. 1, 6, 11 and 13). In said guide plate is arranged a series of stop pins 14 arranged in a double row, the pins of one row being in staggered relation with respect to those of the other row. These pins correspond to the keys in the keyboard, each key, except the justifying key, having its corresponding pin. The pins are arranged in the same order of sequence as that in which the characters are arranged on the type-carrier, and they are adapted to be projected upwardly in the path of the carriage 11, so that in traveling in one direction, the carriage will encounter any projected pin in either of the rows. When the carriage has passed over all of the pins and reached the limit of its movement, the sequence of characters has been completed, and means are provided and will be hereinafter explained for moving the ribbon forward for a new sequence.

The pins are of U-shape as shown and are of spring material. Both arms pass through the guide plate 10 the spring material of which they are formed causing their arms to have a sufficient amount of friction in the apertures through which they pass to remain in raised position when projected upwardly. One of the U arms is enlarged, as shown, to form a stop pin to arrest the carriage; the enlarged end has one of its top edges beveled off (see Fig. 13) so as to present no face to obstruct the return of the carriage, as hereinafter described. The U pins straddle depending pins on the guide plate 10 which limit their upward movement. Between the rows of stop pins 14 is a toothed rack 31, the purpose of which is hereinafter described (see Figs. 6 and 13). Each of the pins is arranged immediately above one of the push-rods 5, so that when one of said rods is projected upwardly by the key action previously described, the corresponding pin is projected above the guide-plate 10 into the path of the carriage, and is held there by reason of its "spring," while the push-rod and its key are returned to normal position by the action of the spring 6.

*The carriage mechanism.* — So far as concerns certain features of the invention, any convenient and suitable form of controller marking mechanism may be employed. In certain of its features, however, a carrier reciprocating across the controller is provided. In the embodied form, the punch carriage travels to and fro transversely of the controller, and is successively arrested at points along the controller where marks or perforations are to be made in the controller. To provide a pathway for the carriage, the guide plate 10 is provided with ways in which is guided the carriage 11 as seen in Figs. 6, 11 and 13. The carriage is reciprocated by suitable motive power hereinafter described so as to move above the lines of the stop-pins 14 and rack 31. Upon the carriage are mounted two pivoted and spring-pressed stop-pawls 15 in position respectively to engage the stop-arms of stop-pins 14 of the corresponding row when the latter are projected (see Figs. 13 and 14). The carriage carries the ribbon marking device, which in the machine shown is a punch 12 and die-plate 13. The die-plate is supported and held in place by means of arms 11' fixed thereto and to the punch carrier proper and guides 11ª in which the die plate reciprocates in its travel transversely of the controller, and is thus preserved in register with the punch. Arms 11' are of sufficient length to accommodate the width of the ribbon 8' which is fed between the punch and die-plate. The punch 12 is mounted in a plunger 12ª, adapted to reciprocate in guides formed in the carriage 11 (see Figs. 1, 6 and 13) to pass the punch through the controller, and to effect certain other results as will be later explained. The T-shaped head of plunger 12ª is engaged in a T-shaped slot in a thrust bar 17 guided in frame 18' mounted on top plate 1' of the machine, which gives the plunger its transverse motion. Thrust bar 17 is connected at each end with a pair of toggle levers 18. The T-head of the plunger is free to slide in the T-slot of the thrust bar to allow for the to and fro travel of the punch carriage 11.

Mounted on the carriage 11 (Figs 6 and 13) is a bell-crank 30, the lower end of whose vertical arm is engaged in a socket 30ª of the plunger 12ª and to the end of whose horizontal arm is attached a retaining bolt 16. Bolt 16 passes through a slot 16ª in the plunger and has its lower end formed to engage with rack 31 in the guide-plate 10. The lower end of bolt 16 is formed of sufficient width to engage one of the members 14ª of the U-shaped stop-pins, the stop-pins being so arranged with respect to rack 31 that one of their members 14ª, comes opposite a space between the teeth of the rack.

The action of the above described mechanism is as follows: A stop-pin having been projected upwardly by depression of its corresponding key, in the manner as above described, the carriage having been released from the previously projected pin, will be arrested at the last projected stop-pin, whereupon the actuation of the toggle lever 18, by the next key following, and by mechanism hereinafter described, will project punch 12 through the ribbon. At the same time the movement of the plunger 12ª actuates the bolt 16 by means of its engagement with the bell-crank lever 30. The bolt 16 engages the rack 31 and at the same time returns the projected stop-pin, by means of its engagement with the stop-pin member 14ª. It will be seen that the bolt will be in engagement with the rack to lock the carriage before the stop-pin has been returned to position out of the path of the carriage. The carriage is thus securely held during the advance of the punch as it enters the paper and while it is being withdrawn, so that on release of the carriage the punch will not tear the paper.

The feed movement of the carriage takes place after the punch is withdrawn. It will also be understood that a character is not punched in the controller at the time its key is depressed to designate it, but is punched upon the designation of the next succeeding character. Thus a great source of errors is obviated, as when a wrong key is struck this fact is usually known before the next key is struck and so may be corrected before it is marked in the controller.

The teeth of rack 31 have their upper lateral edges beveled off, as shown in Fig. 13ª, and the lower end of bolt 16 is reduced so as to fit snugly into the lower portion of the spaces between the teeth. This construction enables the bolt readily to "find" the spaces between the teeth, even should the stop-pins and stop-pawls become worn so as to prevent exact register of the carriage with the rack. The bolt 16 is guided to its seat between the rack teeth by their adjacent beveled edges and when its reduced portion enters between the straight portions of the sides of the teeth the carriage is held in correct and precise position when the punch makes its stroke.

In accordance with one feature of the invention, means are provided in connection with the positioning and operating means for the punch carriage 11, and with the controller feed (hereinafter described) for causing consecutive recurrences of the same letter, that is "double letters" in a word to be recognized by the typographic machine when being operated under control of the controller. In the embodied form of the invention, means are provided whereby one perforation for a repeated letter is on one transverse line of the controller and the other perforation upon another such transverse line. This is effected by causing a line or forward feed of the controller between the successive perforations thereof.

The ribbon feed mechanism is actuated by the carriage when it reaches the end of its stroke, as will be hereinafter described. Upon the faces of each of the carriage stop-pawls 15 are pivoted spring-mounted stop-pieces 44, 44, as clearly shown in Figs. 14, 14ª and 14ᵇ. When these stop-pawls encounter a projected stop-pin, stop-pieces 44, 44, are forced into their seats. As soon as the stop-pin corresponding to the first of the repeated letters is returned by the descent of bolt 16, stop-pieces 44, 44, resume their projected position. As the mechanism that actuates bolt 16 is released by the second operation of the same key, and as the stop-pin is projected before the bolt is actuated, the spring in cap 5' of the punch rods is compressed as the pin is returned and, therefore, when the bolt is withdrawn said compressed spring will project the stop-pin. Upon the second projection of the same stop-pin it will encounter the projected stop-piece 44 and thereby force upwardly the stop-pawl 15. The carriage passes over the stop-pin to the end of its travel, actuates the ribbon feed to feed the ribbon forward one line and upon its next trip the carriage will be stopped by the projected pin and a corresponding mark or perforation for the second of the repeated letters will be made on the new transverse line of the ribbon. In addition to these above described functions, spring caps 5' prevent the downward thrust of the stop-pin, while being returned by bolt 16, from being resisted by the finger pressure on the key when striking the second of the repeated letters. These springs also take up extra motion of key lever being of sufficient strength to raise the stop-pins without being compressed. (See Fig. 6.)

*Punch actuating mechanism.*—The embodied form of means for actuating the punch 12 and toggle 18 are as follows: As above described, the keys are arranged in four rows transversely of the machine and have their stems passing through plates *a* and 1ª, (Figs. 1, 3 and 4). Supported on plate 1ª are brackets 7ª, 7ª which form bearings for rock-shafts 7ᵇ. Fast on these rock shafts are arms 7, 7, which carry in their extremities bail-rods 2″, 2″ extending the width of the keyboard one between the first and second rows of keys and the other between the third and fourth rows. Attached to each of the key-stems is a finger 2' projecting therefrom and over the bail rods 2″, 2″; so that upon the depression of a key, one or other of rock shafts 7ᵇ, 7ᵇ will be rocked. To the same rock shafts 7ᵇ, 7ᵇ, are secured arms 7ᶜ, 7ᶜ, having their extremities in link engagement 8', 8', with one end of a connecting rod 8. At its other end rod 8 (Figs. 5, 6 and 7) has flexible connection with a slotted shaft 8ª mounted to have a longitudinal sliding movement in bearings 8ᵇ carried on a standard 39″ rising from the base 1 of the machine. To the other end of shaft 8ª is attached a spring 39ª to return shaft 8ª and rod 8 to normal position.

Pivoted to the shaft bearing 8ᵇ is a finger 27 which projects through the slot in shaft 8ᵃ. The longitudinal movement of rod 8 and shaft 8ᵃ, through the depression of a key, causes finger 27 to oscillate and trip another finger 26' on the stem of a forked escapement lever 26 pivoted to standard 39''. Escapement lever 26 has engagement with and controls the movement of a three-toothed escapement wheel 25 mounted fast upon a shaft 21 running transversely of the machine and supported in bearings 21' depending from plate 1' of the machine. Upon one end of said shaft 21 is a friction driving pulley 22 (see Figs. 5 and 7) adapted to have belt or other suitable driving connection with a source of power.

The friction pulley 22 is of such construction that when shaft 21 is held from rotation by the escapement lever 26, the pulley sheave slips on the shaft, and when the escapement lever is disengaged from its escapement wheel the frictional mounting of the pulley on the shaft causes the shaft to be driven with the pulley. This pulley is of similar construction to pulley 53 mounted on shaft 52 and described below, so that a detailed description thereof will not be necessary.

The shaft 21 is permitted to rotate step by step under the influence of its driving connection by means of the forked escapement lever 26 and escapement wheel 25. The forked end of the escapement lever is so formed as to permit of the escapement of only one tooth of the escapement wheel at a time. A spring 26ᵃ is provided bearing against one arm of the lever 26 to return it immediately after tripping by finger 27 into position to catch the next tooth of the escapement wheel. The return of the lever is further insured by means of the previously escaped tooth of wheel 25 which engages the one prong of lever 26 and positively returns the other prong into the path of the next tooth of the escapement wheel.

The intermittent rotation of shaft 21 is made to actuate the punch by the following mechanism: Mounted on shaft 21 is a spring case 20ᵃ (see Figs. 15 and 16ᵃ) containing a coiled spring 29 having one end fast to the bearing 21' and the other end fastened to the cap 20ᵇ of the spring case which is loose on the shaft 21. Adjacent the cap 20ᵇ and part of it is a V-shaped piece 20 having a pin 20' extending from one of its arms to the cap 20ᵇ and carrying on its other arm a spring pawl 24. A tie-rod 19 connects the arm of the V-shaped piece, by its pin connection 20' with the cap, to the toggle 18 (see Fig. 6). Fast on the shaft 21 and in position to be engaged by the pawl 24 is a three-toothed wheel 23. Pawl 24 is normally in path of and ready to be engaged by one of the teeth of toothed wheel 23, and when the shaft 21 is set free to rotate by the tripping of the forked escapement lever 26 through the medium of rod 8 and shaft 8ᵃ, the said pawl 24 and V-shaped piece 20 are picked up and carried around with the shaft until the tail of pawl 24 strikes a release stop 28. On coming in contact with stop 28, pawl 24 is released from toothed wheel 23 and through the medium of spring 29, V-shaped piece 20, spring-pawl 24, tie-rod 19 and toggle 18 are returned to normal position limited by stop lugs 21ᵃ and 21ᵇ on bearing 21' and the spring case respectively, and wheel 23 is carried around farther with the rotation of the shaft until the next tooth is in position to take up spring pawl on next partial rotation of shaft 21.

The operation of the above-described mechanism is as follows: Upon depression of a key the rod 8 is moved longitudinally and the escapement lever 26 is tripped by finger 27. Shaft 21 is permitted to rotate to the extent measured by one tooth on the escapement wheel 25. Shaft 21 being momentarily freed from the restraint of the escapement wheel and lever 26, 25, rotates under the influence of its driving pulley. The V-shaped piece 20 being engaged with the shaft through toothed wheel 23 and pawl 24, is moved with it and through the rod 19 pulls the toggle joint 18 downward thereby projecting punch 12 through the ribbon. The return of the parts for the next key operation is as above described.

It will be noted by the arrangement of the parts in Figs. 4 and 6 that the first movement of a key stem while it actuates rod 8 also starts push rod 6 to project a stop-pin, the pin being projected before or at same time that escapement is made. This results in the return of the stop pin corresponding to the previously operated key and the punching of the ribbon for the same previously operated key upon operating the next or succeeding key. In other words, the carriage being in arrested position by a projected stop pin, the next operation of a key will first project its stop-pin and next return the former stop pin, and simultaneously punch the ribbon. The carriage being freed by the return of the punch travels to the projected stop pin which has just been projected. The next operation of a key will punch the ribbon, the retreat of the punch releasing the carriage which travels till arrested by the newly-projected stop pin, and so on during the operation of the machine.

*Unit counting and storing mechanism.*—Typographic machines such as are controlled by controllers, are usually adapted to produce justified matter. In accordance with certain features of my invention, therefore, I provide means for counting and storing the unit width or value of the successive characters marked upon the controller strip, and for ascertaining in terms of such units the discrepancy between the total of such width or value for the composed matter for a line and the exact line measure. This is done, so that the width or value of the word spaces so that the composed matter will be justified exactly to the line measure. In the embodied form of the invention, a standard word space is provided and these word spaces are then modified to the required degree, so that in the matter produced by the typographic machine will have word spaces of such value that each line will be exactly justified to the line measure. It will be understood, however, so far as concerns certain features of the invention, that other forms or systems and mechanisms for justifying the lines may be used.

In accordance with the features of the invention above outlined, means are provided in the embodied form for counting the unit value or width in the line of the successive characters composed in the line, and for storing them; for communication and transference to the justifying devices, which latter mark the controller so that the word spaces as reproduced by the typographic machine will be of the proper value to effect justification of the lines. Referring to the illustrated mechanism, a line of any given number of units may be determined upon, and a rack, hereinafter described, set to that number of units. An alarm or signal 89ª is provided to inform the operator when the matter he has represented on the ribbon has approached to within a certain number of units of the length of line determined upon; so that he may judge whether or not to divide a word or print it wholly on the next line. The number of units left represent the numbers of space units which must be inserted in the line in order to justify it.

The mechanism for counting and storing the space units represented by the type characters and word spaces includes a device successively movable as each key is actuated and by its movement counting and storing the units of a line to be later communicated to the justifying mechanism. The embodied form thereof is as follows: A space unit wheel 51, adapted to receive a rotary movement proportionate to the unit width of each successively selected character, (see Figs. 5 and 6, and 11 and 11ª) is provided, mounted upon and fixed to rotate with a shaft 52 which is supported in bearings in standards rising from base 1 of the machine. Said wheel has on its peripheral edge a series of holes 51′, and on its rim face a corresponding series of holes 51″ and fast to one face a crown tooth wheel 78, the teeth of which correspond to the holes in periphery and rim of wheel 51. The spaces between adjacent holes and teeth correspond to one space unit. Shaft 52 upon which the space unit wheel is mounted, is under a continuous impulsion to rotate but is held therefrom except when unit wheel 51 is permitted to rotate in recording units. Said shaft is mounted in bearing brackets 52ª, 52ª rising from the base 1 of the machine, (Figs. 5 and 7) and has mounted on its left end, as seen in Fig. 5, a spring case 76′. One end of the spring 76 of said case is attached to shaft 52 and the other end is secured to the case 76′. Mounted in line with shaft 52 is a stub-shaft 53′ suitably supported in a bracket 53ª. Upon said stub-shaft is mounted a friction pulley comprising a sheave 53 which runs between cheek pieces 53ᵇ and 55. Cheek piece 55 is formed with sleeve or tubular hub-portions surrounding the stub-shaft and forms a bearing upon which the sheave 53 runs. The cheek-pieces are pressed into frictional contact with the sheave by means of a spring 53ᵈ surrounding the stub-shaft and a set collar 53ᵉ, the degree of friction being adjustable by means of the set-collar. Cheek piece 55 is engaged with cheek piece 53ᵇ through pins 53ᶠ so that both rotate together. The contact faces of sheave 53 are provided with friction surfaces, such as billiard cloth or felt, shown in heavy lines in the drawing, in order to insure the necessary degree of friction. Cheek piece 55 has attached to its rim one end of a spring leaf 74, the free end of which projects toward the shaft 52, (see Fig. 16). The hub 75 of the spring-case 76′ is in the form of a flat sided polygon, against one of the sides of which the free end of spring 74 finds a flat bearing surface. The pressure with which spring 74 bears on a side of hub 75 is variable by means of a set screw 74ª, as shown in Fig. 16.

The operation of the above-described parts is as follows: Sheave 53 having been belted to a source of power, rotates. Shaft 52 is normally held from rotation by means of the engagement of unit wheel 51 with lever 54, hereinafter described. Sheave 53, therefore, runs idle upon the sleeve-portion of cheek piece 55, unless the spring of spring case 76′ be not fully wound, in which circumstance the power required to wind said spring will be insufficient to overcome the friction between the cheek-pieces and sheave. Under these conditions cheek-piece 55 will rotate with the sheave and carry with it, by the pressure of spring 74 thereon, the hub of spring case 76′, causing the latter to rotate until spring 76 becomes fully wound when spring 74 will slip over the angles on the polygonal hub 75 or the friction of the driving pulley is overcome. By this construction it will be seen that shaft 52 and unit wheel 51 are spring driven by the action of spring case 76′. This insures an immediate and quick response and rotation of the same immediately they are released, and also has an important advantage in that the motive power is not subjected to sudden checks by the escapement, but that it is only the force of the spring in the spring case which is checked by the escapement lever. The mechanism is thereby saved from the heavy shocks which would result were the driving power transmitted directly to shaft 52. It will also be seen that the spring-case is automatically kept wound.

In the embodied form of means whereby the unit wheel 51 is permitted to rotate proportionately to the successive composed characters, pivoted in a bracket depending from plate 1' of the machine and adjacent the periphery of wheel 51 is a bell-crank lever 54, (see Figs. 5, 11 and 11ª). Said lever 54 has on its horizontally extending arm a pin 54' positioned to engage the uppermost hole in the peripheral edge of wheel 51. The horizontally extending arm of the bell-crank 54 is fork-shaped; the purpose of which appears hereafter. The downwardly extending arm of the bell-crank is provided with a friction roller which engages a cam 55 mounted upon shaft 21 which carries escapement wheel 25, before described. Cam 55, as clearly seen in Fig. 11, is formed with three high parts or "dwells" which retain lever 54 out of engagement with the unit wheel while the latter is performing its function of counting the units. Mounted on a bracket depending from plate 1' of the machine is a bell-crank lever 56, the horizontally extending arm 56 of which is engaged in the fork of bell-crank lever 54 (see Figs. 5 and 11). The lower end of the downwardly extending arm of bell-crank 56 is yoke-shaped and engages a collar formed on a sliding sleeve 57 loosely mounted on shaft 52. The end of said sleeve 57 adjacent the collar is provided with a cheek piece in engagement with a mating cheek piece 58 carried on but not fastened to shaft 52, by means of pins 58' which permit of the sliding of sleeve 57 on its shaft while maintaining its engagement with cheek piece 58. Said cheek piece is prevented from moving longitudinally by a retaining piece 58'' having a pin 58''' which projects into a groove on the cheek piece. Upon the opposite end of sleeve 57 is an arm 57' having a pin 57'' therein, which is projected into a perforation 51'' on the face of the rim of the space unit wheel 51 at the instant pin 54' is being withdrawn from the hole in the periphery of said wheel, as clearly seen in Fig. 11ª. Bell crank levers 54 and 56 and sleeve 57 are so arranged that the pin on arm 57' enters the hole in the rim opposite thereto just before pin 54' is withdrawn from its hole. The space unit wheel on being released from the pin 54' by the cam on shaft 21 is free to rotate; but its rotation is limited according to the space unit value of the type character or word space corresponding to the position of the punch and carriage 11. This is accomplished by the following means and mechanism: A gage interposed or comprised in a mechanism to govern the amount of movement communicated thereby to the unit counting and storing wheel or member, is movable to vary the amount of movement so communicated to said unit wheel to correspond to the different characters represented by a given key and as selected by the shift mechanism, is provided. This gage is movable in accordance with the movement or change of the shift mechanism. In the embodied form of such means, a space unit gage 63 is mounted beneath plate 1' of the machine adjacent to and extending along the path of the carriage, (see Figs. 5, 6, 8ª and 11). This space unit gage is formed with vanes or ribs 63' two of which are provided with notches of different depths. The number of vanes on the gage in a particular machine corresponds to the number of shifts, that is, to the number of different characters which may be designated by a single key. The notches correspond to the type characters and the depth of a notch represents the space-unit value of the character it represents. The space-unit gage is journaled as at 62, so that it may be rotated (by means hereinafter described) to present either one or other of the notched vanes to an interponent 64 (Figs. 6 and 11). One of the notched vanes has its notches corresponding to space-unit values of lower case type characters and the other notched vane has its notches corresponding to the space-unit values of upper case type characters.

Upon the carriage 11 is pivotally mounted a depending arm 61 (Figs. 6 and 11) the lower end of which is loosely and slidably mounted on a guide rod 60'. Pivotally and resiliently mounted upon the lower end of said depending arm is the interponent 64 which is retained in engaging position for the notches in the vane of the space-unit gage which is at the time in operative relation with the interponent by means of springs 64ª, one on each side.

The space-unit gage and the interponent coöperate to limit the rotation of the space-unit wheel to an amount corresponding to the unit value of the type characters as they are marked upon the ribbon. The embodied form of mechanism by which they give the requisite and proper amount of movement to the unit wheel is as follows: Guide rod 60' upon which the interponent is guided forms part of a swinging frame composed by said guide rod 60', rod 60ª both carried in arms 60 and mounted fast on a rock-shaft 60ᵇ (Figs. 11 and 7). A spring 60ᶜ surrounds shaft 60ᵇ and bears against rod 60ª to return the frame to normal position after having been swung. An adjustable stop 60ᵉ is provided (see Figs. 5 and 6), to limit the return movement of the frame. Rod 60ᵃ is connected by an adjustable connection 59 to cheek piece 58. Said adjustable connection 59 consists of a turn-buckle and two-part bolt, which is a common form of adjustment and does not require detailed description. Space unit wheel being connected through arm 57', sleeve 57 and pins 58' with cheek piece 58, its rotation is limited by the depth of the notch to which the interponent 64 is presented by the carriage. The interponent swinging frame and a pin frame 57' thus act with the unit gage to measure the unit values of the several characters and spaces by limiting the movement of the unit wheel in accordance therewith.

The means for storing the space units as they are counted by the space unit wheel in the manner above described, are as follows: A sleeve 79 (Figs. 2, 5, 5ᵃ and 7) is mounted loosely and slidably upon shaft 52 and has fast on its end adjacent wheel 51, an arm 79' formed with a tooth 79" to engage the crown teeth 78 on said wheel. Upon its opposite end it has a tooth 87 adapted to engage a corresponding tooth 88' upon a pinion 88 loosely mounted upon a sleeve which is a bearing for shaft 52. Said pinion 88 is in mesh with a toothed unit storing rack 89 mounted to slide in suitable guides upon the frame of the machine. Said rack is constantly urged rearwardly and against the rotation of shaft 52 and sleeve 79 by means of a weight 89ᵃ attached to its front end by means of a cord 89ᵇ, (see Fig. 2). As the space unit wheel 51 is rotated, by an amount corresponding to the space unit value of the characters as they are represented on the ribbon, by the mechanism above described, the units are stored upon rack 89 by its movement toward the front of the machine. The said movement being proportional to the space units represented and counted by the rotation of space unit wheel 51. It will be noted in Fig. 5 that there is a space of about half a revolution between tooth 87 and tooth 88' on pinion 88 so that the rack 89 will not advance until the unit wheel has made about a half revolution. This cuts the travel of the rack as the machine does not justify lines less than two inches long. The rack 89 will thus be gradually moved toward the front of the machine until all the units represented by the characters and normal word spaces which make up that part of the line which is justified have been stored on the rack.

An alarm 89ᵃ is provided to warn the operator when the line has approached the length determined upon. The alarm is set to be rung a few units short of the full length of the line so as to give sufficient notice to the operator that he may determine whether the next word may be written in that line or must be given to the following line, or that he may properly divide a word, giving part of it to that line and part of it to the new line. The alarm may be set for lines of various lengths. The means by which the alarm is sounded is as follows: A series of holes are provided in the side of rack 89 in one of which is inserted a pin 89ˣ. In the path of the pin is a pivoted piece 89ᵇ provided near its lower end with a stud 89ᶜ. Adjacent piece 89ᵇ is pivoted the hammer 89ᵈ which sounds the alarm. The arrangement is such that pin 89ˣ, in the forward travel of the rack strikes piece 89ᵇ, and by engagement of its stud 89ᶜ with hammer 89ᵈ raises the latter. When the pin 89ˣ has passed over piece 89ᵇ the hammer falls, striking the alarm. When rack 89 is returned, pin 89ˣ carries piece 89ᵇ with it swinging its stud 89ᶜ away from the hammer so that the alarm is not sounded. By setting pin 89ˣ in any one of the holes in rack 89, the ringing of the alarm may be accommodated to a line of any desired length. When a line has received all its characters and normal spaces, justification of the line will then be made by means which will be presently described. Assuming however that the justifying has been performed, it becomes necessary to restore tooth 79" and the rack 89 to normal position in readiness for the next line.

The means for restoring the rack 89 to normal position after completion of a line are as follows: A lever 80 is pivoted near its center to a standard rising from the base of the machine (see Figs. 5 and 7). The upper end of said lever is yoke-shaped and engages a collar 80ᵃ on sleeve 79 and, by means of a spring 80' bearing against the lower end of lever 80, sleeve 79 by its tooth 79" is maintained in engagement with space unit wheel 51. At the completion of a line, and after the justification mechanism has been set, by means hereinafter described, the "finis" key 2ᵈ (see Fig. 1) is operated. This, through its connection 82, 81 (see Fig. 7) depresses a wedge-shaped cam-piece 81' on end of 81 adjacent to 80 against the lower end of lever 80 and causing it to draw sleeve 79 and tooth 79" out of engagement with unit wheel 51. As soon as the lower end of lever 80 is pressed outwardly by cam-piece 81', a spring latch 153 pivoted on the same standard as lever 80 drops into position to engage a stud 80ᵇ on lever 80 and holds it in operated position. Sleeve 79 being thus freed from engagement with the unit wheel, pinion 88 engaged by the tooth 87 of said sleeve, is also freed and the weight 89ᵃ pulls rack 89 back to normal position thereby causing pinion 88 to rotate backwardly.

In order that pinion 88 may be free to return, means are provided, as follows, to insure the return of sleeve 79 previous thereto; otherwise the tooth 87 on said sleeve would obstruct the return of the pinion. Such means comprise a coiled spring 83, having one end fast to the base of the machine (see Fig. 5) and having attached to its other end a cord 83'; the opposite end of said cord being wound about sleeve 79 for a few turns and then secured thereto. As soon as the tooth 79'' is withdrawn from engagement with the crown teeth on the space unit wheel, spring 83 quickly contracts and through the medium of cord 83' quickly returns sleeve 79 to normal position. Spring 83 acts much quicker than weight 89$^a$ and returns sleeve 79 before the weight can return pinion 88. An automatic stop is provided to arrest the return of sleeve 79, when it reaches normal position. Said stop is best shown in Figs. 5, 5$^a$ and 7, and consists of a bolt 84 slidably mounted in bearings on a standard 84'' rising from the base of the machine. Said bolt is provided at one end with an arm 84' normally extending into the path of arm 79' of sleeve 79. At its other end bolt 84 is provided with a collar which is engaged by a pin 86'' projecting from the lower side of one end of finger 86 which is pivoted at its other end to a post rising from the base of the machine. Near the center of said finger 86 and projecting from its upper side is a stud 86' which is engaged by a screw-thread 85 on sleeve 79. The operation of these parts is as follows: As sleeve 79 is rotated during the counting of the units on wheel 51, the screw-thread 85 draws bolt 84 and its arm 84' back from its position in Fig. 5 (see Fig. 5$^a$). On the return of sleeve 79 by means of spring 83 said stop arm 84' is returned into the path of arm 79' and arrests it.

Means are provided, as follows, for returning sleeve 79 and arm 79' into engagement with the crown teeth of wheel 51: The next operation after depressing the finis key which withdrew said arm from its engagement with wheel 51, as above described, is to depress justification key 2$^k$ (Figs. 1 and 2), which, in addition to other functions hereinafter described, raises latch 153, through its connections 154 (see Figs. 5 and 7), spring rock-shaft 154', connection 154'', bell-crank lever 139$^c$ (Figs. 2 and 4). The latch 153 is kept out of engagement by resting on stop pin 80$^b$ (Fig. 5), as shown. This permits the lower end of lever 80 to swing inwardly and to slide sleeve 79 by its yoke connection therewith into engagement with the crown teeth on wheel 51 ready for counting units in a new line.

*Controller feeding mechanism.*—After the full number of marks or perforations which occur in a single transverse line thereof have been made, a feed thereof to the next line is made. In the embodied machine, means are provided for automatically effecting the controller feed. Said means coöperate with the punch carriage 11, which as herein shown makes a complete reciprocation for each transverse line of the controller perforated. The illustrated form of said means is as follows: Referring to Figs. 5, 6 and 12, a feed roll 9 is provided having sprocket teeth 9' to engage marginal perforations on the edges of the ribbon, thereby insuring a positive feed. The feed roll is mounted on and fast to a suitable shaft 9$^b$ carried in bearings on plate 1' of the machine. A presser roll 9$^a$ is mounted above the feed roll to keep the ribbon in engagement therewith. In order to keep the ribbon taut a brake or drag is provided on plate 1, consisting, as shown in Figs. 6 and 7, of a spring-pressed bar 45$^a$ provided with a friction pad 45$^b$ of felt, cloth or other suitable material, between which and bar 45$^c$, the paper is drawn by rolls 9 and 9$^a$. Mounted upon one end of the feed-roll shaft is a driving pulley 45 by means of which said shaft may be driven by connection with a friction pulley 45$^a$ (see Fig. 7) on shaft 46 which is connected by pulley 47 to a source of power and is constantly rotating. Upon the other end of said feed-roll shaft is an escapement wheel 48. Adjacent the escapement wheel is an escapement lever 49 fastened to one end of a rock shaft 49$^a$, which is supported on the under side of plate 1' in suitable bearings. A spring 49$^b$ is coiled about the shaft to return the same after operation to normal position. Upon the other end of said rock shaft 49$^a$ is a finger 49$^c$.

The end of escapement lever 49 in engagement with the escapement wheel is formed with two dogs or teeth 49$^d$, 49$^e$. Dog 49$^e$ is a spring dog as clearly shown in Figs. 6 and 12$^a$. Finger 49$^c$ projects into the path of carriage 11 near its end and beyond the last stop pin 14 so that it will be encountered by the carriage after it has passed all the stop pins. When therefore the carriage nears the limit of its travel it strikes finger 49$^c$ and through its rock shaft 49$^a$ oscillates escapement lever 49 so that its fast dog 49$^d$ passes out of engagement with escapement wheel 48. At the same instant, however, loose dog 49$^e$ catches the next tooth of escapement wheel 48 and under the influence of its driving connection with the source of power the feed-roll shaft is free to rotate until the loose dog is depressed by the next tooth of wheel 48 and strikes a shoulder 49$^f$ formed on the escapement lever. The amount of rotation of the feed-roll shaft thus permitted is the space between two lines of marks or perforations on the ribbon. When this is accomplished the carriage is returned to the opposite end of its path by mechanism hereinafter described and rock shaft 49$^a$ is returned to normal position by means of its spring 49ᵇ thereby returning fixed dog 49ᵈ into engagement with escapement wheel 48 at the same time disengaging loose dog 49ᵉ which is returned by its spring into position to catch the next tooth at the succeeding operation. The ribbon is also caused to be automatically fed forward whenever the shift key is operated so that the perforation or mark corresponding thereto may be represented on a transverse line by itself. This is accomplished by the following means: On the stop pin corresponding to the shift key (see Fig. 12) is a stud 14ᶜ projecting from one side thereof. A slotted link 14ᵉ is pivoted at one end to finger 49ᶜ which operates the escapement lever 49 as above described. At its other end link 14ᵉ is provided with a slot-engaging pin 14ᵇ. When in normal position link 14ᵉ projects a slight distance in advance of the face of the shift key stop pin, so that when said pin is projected upwardly by operation of the shift key the projecting end of link 14ᵉ is first struck by the carriage, thus rocking finger 49ᶜ, rock shaft 49ᵃ and lever 49, thereby releasing escapement wheel 48 on the feed-roll shaft and causing the ribbon to be fed forward one space. The carriage being arrested by the shift-key stop-pin, the next key operation punches the ribbon and simultaneously returns the stop-pin as before explained, whereupon the escapement lever returns to first position presenting finger 49ᶜ in normal position. Thereupon the carriage proceeds to the end of its travel encounters finger 49ᶜ and again causes the ribbon to feed forward.

*Carriage actuating mechanism.*—The means for actuating the carriage is as follows: Attached to the carriage is a rod 32 (Figs. 1, 5, 6 and 7) having a piston 33′ at its opposite end working under fluid pressure in a cylinder 33 mounted on plate 1′ of the machine. Said cylinder is connected by a supply pipe 33ᵃ with any convenient source of fluid pressure. I have found compressed air to be the most satisfactory and promptly acting motive fluid; but it will be understood that any convenient motive fluid may be employed. Mechanical means may be substituted for fluid pressure to actuate the carriage, if desired. I prefer, however, to employ compressed air on account of its ready accessibility and quick and positive action.

Means for actuating the carriage are shown in Figs. 1, 2, 6 and 7, as follows: At one side of the main pressure cylinder 33 is a valve-sleeve 34ˣ having its ends open to the atmosphere. The form of the valve sleeve 34ˣ is shown on a larger scale in Figs. 24ᵃ and 24ᵇ. Within the valve-sleeve is reciprocated a valve 34, by the movement of which the pressure fluid is admitted through one or other of ports 34ᵃ, passages 34ᶜ, to one or other side of piston 33′, thereby driving the carriage through piston rod 32 in one direction or the other.

Valve 34 is reciprocated to cause a reversal of the movement of the carriage by the following mechanism: Pivoted upon plate 1′ are two arms 35, 35′. Arm 35 is pivoted near its center whereas arm 35′ is pivoted at its end. Arm 35 is tied at its rear end by means of tie-rod 36 to an intermediate point of arm 35′. The connections between rod 36 and the respective arms are slotted as shown. A spring 36ᵃ, 36ᵃ is provided to return the arms to normal position after actuation. Stops 36ᵇ, 36ᶜ, 36ᵈ, 36ᵉ are provided on top plate 1′ to limit the swing of arms 35, 35′. The forward ends of arms 35, 35′ are arranged at the ends of the path of the carriage so as to be struck and moved thereby when the carriage arrives at each end of its travel. The end of rod 36 is engaged, by an adjustable connection, to one end of an escapement lever 37 (see Figs. 2, 6, 24 and 24ᵃ). Said escapement lever is pivoted near its middle upon a standard 39′ rising from base plate 1. The lower end of this escapement lever is of similar construction to that of escapement lever 49 for the ribbon feed roll, and need not, therefore, be further described. Journaled in the standard 39 is a shaft 39 provided with a friction pulley 40 through which, by suitable belt connection with the source of power, it is driven when the escapement lever 37 is rocked to bring its spring tooth into engagement with an eight-toothed escapement wheel 38 mounted fast on the shaft 39. Fast upon said shaft is a four-lobed cam 41 having in engagement therewith a cam-roll on the end of arm 42 (Figs. 6 and 7). Arm 42 is fast on spring-mounted rock-shaft 42ᵃ journaled in a bracket depending from plate 1′. To the other end of said rock-shaft is an arm 42ᵇ projecting upwardly through plate 1′ and having its upper end connected to the valve-stem of valve 34.

The operation of the above-described mechanism is as follows: Starting with the carriage traveling to the right, (see Fig. 1), and the cam roller on rock-shaft arm 42 on a lobe of the cam, when the carriage reaches the end of its travel it strikes arm 35′, thereby swinging escapement lever 37, allowing escapement-wheel 38 and its shaft to be driven an amount equal to one tooth of the escapement-wheel, which brings a hollow of the cam beneath the cam roller on arm 42. The movement thus made by arm 42 is communicated by rock-shaft 42ᵃ to arm 42ᵇ and thence to the valve 34 which is thrown to the right closing the exhaust of right-hand port 34ᵃ to the atmosphere and opening it to the pressure supply, while at the same time performing the reverse effect with left-hand port 34ᵃ. Immediately the valve 34 is thrown to the right, the pressure fluid enters cylinder 33 from the right-hand end, while exhaust takes place on the left through 34ᵇ and port 34ᵃ to the open end of valve cylinder.

I have shown in Figs. 24 to 27ᵃ modification of the valve shifting mechanism. Figs. 24 and 24ᵃ show means by which the valve is actuated through an auxiliary valve by the fluid pressure itself. Attached to the stem of valve 34 is a piston 35ᵃ working in a small cylinder 34ᶜ having ports 34ᵈ therein for the admission and exhaust of pressure fluid. Said ports are controlled by a valve 36ᵇ working in a cylinder having its ends open to the atmosphere. Said valve 36ᵇ and its cylinder are of similar construction and operate in the same way as valve 34 and its cylinder above described. A branch pressure supply pipe 36ᵉ connects cylinder 34ᶠ with the source of pressure.

Valve 36ᵇ is automatically controlled by the movement of the carriage 11 itself through the following connections: A lever 37ᵇ is pivoted on a stud 37ᶜ rising from plate 1' of the machine. To one end of said lever the stem of valve 36ᵇ is connected and to its other end is attached a tie-rod 36. Said tie-rod connects valve 36ᵇ with fingers 35, 35' pivoted on studs on plate 1'. Said fingers are arranged one at each end of the path of the carriage and in position to be struck by the same, and are frictionally held against the plate so that they remain in position when left by the carriage.

The operation of the above-described mechanism is as follows: When the piston in cylinder reaches the end of its stroke on the right the carriage will have reached the end of its stroke and will then strike finger 35' which through its connections and valve 36ᵇ will move the same in opposite position to that shown in Fig. 26ᵃ. This in turn will through the medium of piston 35ᵃ reverse the position of valve 34 thereby admitting the pressure fluid to the right hand end of cylinder 33 and exhausting that in left end and drive the piston therein and thereby the carriage connected thereto in the opposite direction. On striking finger 35 the valve 36ᵇ is moved again to its original position.

Figs. 25, 25ᵃ and 25ᵇ show another modification for actuating valve 34, in which the stem of valve 34 is attached to the end of finger 35' by means of rod 38ᵇ having a slotted end. Fingers 35, 35' are tied by tie-rod 36 and said tie-rod is provided with an extension 36ᵃ having a depending pin 36ᵈ (see Figs. 25ᵃ and 25ᵇ). Adjacent said extension is mounted a pivoted spring latch 36ᵉ. A weighted arm 39ᵇ pivoted to plate 1' at one end, and having at an intermediate point a connection with valve stem 38ᵇ. Said arm is freed from its latch by pin 36ᵈ engaging the beveled end as shown in Fig. 25ᵃ and said weighted arm is pushed over to the position shown in Fig. 25ᵇ. On the return movement of rod 36, latch 36ᵉ is by its spring thrown up so that its outer end is depressed below arm 39ᵇ and said arm is returned to its original position. The lost motion between 38ᵇ and pin in 35' is so that 39ᵇ is unlocked before it starts to swing. The weight on arm 39ᵇ insures the complete and positive throw of the valve in either direction.

In Fig. 26 a spring 39ᶜ attached to a pivoted arm 39ᵈ connected to valve stem 38ᵇ so as to retain it in either one of its positions shown in figure in full and dotted lines, accomplishes the effect of the weighted arm above described.

Figs. 27 and 27ᵃ show another modification similar to that shown in Figs. 1, 2, 6 and 7, but with the escapement wheel and lever arranged horizontally and without the cam. The stem of valve 34 is connected through a lever 39ᶠ and pitman rod 39ᵍ to escapement wheel 39ʰ. The escapement lever 39ⁱ is fork-shaped and is connected to tie-rod 36. The escapement wheel is provided with only two teeth and is actuated by means of beveled gears 39ʲ, one on the vertical shaft of the escapement wheel and the other on shaft 39ᵏ. Said shaft is driven by a friction pulley shown in dotted lines, Fig. 27.

It will be understood that the several modifications of the carriage actuating mechanism or parts thereof shown and described are illustrative and not restrictive.

*The shift mechanism.*—As previously stated the gage 63 is moved with the change in the character designated by the particular key. Means are provided at the keyboard for bringing the proper vane of the unit gage 63 into operation and the controller is correspondingly marked so that the typographic machine will select the proper character. As previously stated, in the present machine, the unit gage 63 is provided with two vanes having notches therein corresponding to the space units of the characters pertaining thereto; the notches in one vane representing the space-unit values for the lower case characters and signs, and the notches in the other vane representing the space-unit values for the same characters in the upper case or capitals and other signs. The lower case characters being those most frequently used, the lower case vane is normally presented to the interponent. When it is desired to mark the ribbon to represent an upper case character the shift key is operated, whereupon its stop pin is projected upwardly through key levers 4ᵃ, 4ᵃ and rock-shaft 4ᵇ (Fig. 7), and the upper case vane of the space-unit gage is presented to the interponent by means of the following mechanism, which also causes the automatic return of the space-unit gage to normal position with the lower case vane presented to the interponent in readiness for the next character: The forward end of key lever 4ª, carries a pivoted spring-latch 66 (Figs. 8 and 9) having a tail-piece 66' extending upwardly and backwardly. A rock-shaft 67ᵇ is mounted in bearings 67ª on plate 1 of the machine. Secured on said rock-shaft are arms 67, 67ᶜ (see Figs. 5, 8 and 10) one of which extends adjacent key lever 4ª and is provided at its end with a stud 66ª in position to be engaged by latch 66 (Fig. 9ª). The other arm 67 extends upwardly and has connected to its end a tie-rod 68 connecting therewith a sector lever 69 which is pivoted to a standard 69ª rising from base plate 1. The sector lever 69 has the toothed sector at its upper end in engagement with a pinion 70 fast on shaft 62 which carries the space-unit gage 63. Mounted upon the same shaft and fast to it is a disk 71 having a notch therein as shown in Figs. 10, 10ª, and 10ᵇ. A spring-mounted bell-crank arm 73 is pivoted below said shaft 62 having one of its arms formed with a tooth in position to engage the notch in disk 71; and having its other arm in the path of rod 60' of the swinging frame 60 upon which slides the interponent 64. To said rod 60' is attached a finger 60'' in position to engage the vanes of the space-unit gage.

The operation of the above mechanism is as follows: Upon depression of the shift key 2ª its stop-pin is first actuated, then on the continuation of its depression latch 66 engages pin 66ª as shown in dotted lines, Fig. 8. On the return of the key-lever arm 67 is picked up and raised against the tension of spring 72 thereby rotating sector lever 69, pinion 70 and space-unit gage 63, until arm 73 of the bell crank snaps into the notch of disk 71 and holds the gage in the position shown in Fig. 10ª. This movement is slightly more than a quarter of a revolution and carries the upper case vane slightly beyond the required position as shown in Fig. 10ᶜ. Upon operation of the key for which the shift was made (which will be the next key to be operated after the shift key) the swinging frame will be swung carrying with it the bell-crank and disengaging its arm 73 from disk 71. Finger 60'' has at the same time moved forward over the upper case vane, holding the same and by engaging a groove 60ˣ therein bringing it to proper position shown in Fig. 10ᵇ. During this movement the notch is carried in its return direction out of the path of arm 73, so that on depression of the succeeding key, the gage returns under the influence of spring 72 to normal position with the lower case vane presented to the interponent, lever 67ᶜ and 67 having been disengaged from latch 66' by the tail of the latter striking plate 1ª (see Fig. 9). A stop 63ª (Fig. 8) arrests the gage at normal position. As there are no units counted when the carriage is at the shift pin, the vanes of the gage at the place where the interponent 61 then is, are of such a height as to allow no motion when the frame 60 attempts to advance.

*The justification mechanism.*—When all the characters and normal word spaces which go to make up the length of line determined upon have been represented upon the ribbon, and all the space units occupied by said characters have been counted upon the space-unit wheel and stored upon the space-unit rack, the next operation is to make the proper justification marks necessary to cause the typographic apparatus to justify the line.

The invention according to one of its features, produces a controller in two parts, one part thereof containing all the character selecting marks or perforations and the other part thereof containing the marks or perforations for the justification. So far as concerns other features of the invention, it is immaterial whether the controller is in one or more parts. In the present embodiment, the justification perforations are made in a separate strip, which with the strip containing the corresponding character perforations constitute the complete controller.

The justification mechanism is mounted in rear of the perforating mechanism above described upon a base plate 1ᵇ, (see Figs. 1 and 2). The justification mechanism is shown in Figs. 21 to 23ᵇ inclusive detached from the perforating mechanism. Means are provided in the justification mechanism for receiving a record of the number of word spaces in a line and also a record of the difference in the number of composed units and the number of units constituting the line measure, and for automatically apportioning this difference among the word spaces to effect the justification. This apportionment in the embodied form comprises perforations in the justifying controller, which in the typographic machine modify the word spaces to produce the justification in the product of the typographic machine.

The automatic apportioning mechanism in the present embodiment is manually operated; that it, it is entirely automatic in that the apportionment is performed by the machanism without computation or calculation on the part of the operator. The manual operation takes the place of the power actuation of the other parts of the machine merely as a matter of convenience of design.

Referring more particularly to the embodied form of the invention, there are provided in the justification mechanism a plurality of justification controller marking devices corresponding to the word spaces of the lines, sufficient in number to provide for the maximum word spaces which may occur in a line, and in connection therewith means controlled from the keyboard or composing mechanism for indicating in the justification mechanism the number of word spaces in the line and permitting that number of the justification controller marking devices to be able to coöperate if needed with the mechanism for alloting the line difference. By this term I mean the difference between the unit value of the line as composed and of the line measured. The justifying mechanism comprises also a device having a movement corresponding to the line difference and which gives a step by step movement to the number of controller marking devices which have been rendered coöperative as above explained, or so many of them as may be required, to take up the line difference. Said justification mechanism also comprises means for transferring the setting of the controller marking devices to the controller.

In fuller detail, the embodied mechanism comprises a plurality of punch slides, means for releasing a number of these corresponding to the number of word spaces in the line, and a reciprocating device having a total amount of movement equal to the line difference which moves step by step the punch carrying slides until the position of the slides has absorbed or corresponds to the full line difference, and means for then punching the justifying controller with the final setting of the slides. It will be clear that this mechanism could be used with a one part controller as well as a two part controller so far as concerns its general features.

The justification mechanism is set for operation by the following instrumentalities. A justifying lever is provided at the right of the keyboard as indicated in Figs. 1 and 2 by the numeral 93. This lever is shown in detail in Figs. 17, 18, 18ª, 19 and 20, when it is seen mounted upon a stud 99ª supported in a bracket 99ᵇ on plate 1 of the machine. Secured to one side of said lever is a gear 99 in mesh with a gear 98 fast on a shaft 96 also mounted in bracket 99ᵇ. Secured to said shaft is a collar having a quadrant-shaped shoulder 96″. Adjacent said collar and loosely mounted upon the same shaft, is another collar 95 provided with arms 95′ and 95″. Said collar 95 has a cut-away portion 95ᶜ (see Fig. 18ª) engaging the shoulder 96″ on one side thereof and having a considerable clearance on the other side of said shoulder 96″ as clearly shown in the figure. A coiled spring 97 surrounds the shaft having one end secured to arm 95″ thereon and its other end secured to a stud on shoulder 96″ in such a manner that said spring always maintains the cut-away portion 95ᶜ in contact with shoulder 96″ as shown in Fig. 18ª, so that when the shoulder is moved forward by the justifying lever sleeve 95 and its arms 95′, 95″ follow it. Arm 95′ has pivoted on its end a spring pawl 95ª (Fig. 20) to engage ratchet wheel 94 when said arm is moved upward by operation of the justifying lever. In normal position it is held out of engagement by a post 95ᵇ on plate 1 of the machine, against which its tail rests. Ratchet wheel 94 is secured to a sleeve 92 mounted in bracket 99ᵇ which also forms a bearing for the outer end of shaft 96 as shown in Fig. 19. Said sleeve 92 also carries fast thereon an adjusting disk 90. Adjacent to disk 90 and free on sleeve 92 is a pinion 92′ which is in mesh with a set rack 91. Disk 90 is provided with a series of notches 90ª and a curved slot 90″ through which passes a screw stud 90ᵇ which enters a threaded hole in pinion 92′, (Fig. 20ᵇ). A toothed plate 90′ is clamped by means of said screw stud so that it engages one of the perforations 90ª and thus adjustably clamps pinion 92′ to disk 90. A spring case 100 is mounted on stud 99ª and is provided with a gear 100′ which meshes with a gear 94′ secured on ratchet wheel 94. A graduated and notched scale 102 is provided at the end of rack 91 on which is an adjustable stop 101 whereby the normal or starting position of said rack may be adjusted according to the length of line desired. The slotted disk 90 and its screw stud 90ᵇ above described accomplish the same purpose. The scale stop is provided as an additional means of adjusting the starting point of rack 91. A spring retaining pawl 102 and latch 103 are provided for the ratchet wheel. As said ratchet wheel is rotated its teeth are engaged by pawl 102 which holds it in advanced position. When it is desired to return the ratchet wheel to normal position after the justifying mechanism has been set by the operation of the justifying mechanism, the tail of pawl 102 is raised through the operation of the finis key and its connection 82 (see Fig. 1) thus disengaging said pawl and ratchet wheel. Latch 103 immediately engages a stud 102′ on pawl 102 and retains it out in disengaged position until the ratchet wheel has been returned by means of spring case 100 to normal position. This position is reached when a stud 103′ on the ratchet wheel comes in contact with latch 103 and disengages it from pawl 102 which immediately snaps into engagement with and holds the ratchet wheel.

The operation of the above mechanism thus far described is as follows: Pressing justifying lever 93 arm 95′ on collar 95 is moved upwardly and its pawl engages the ratchet wheel rotating the same as well as sleeve 92 and pinion 92', and thereby carrying rack 91 toward the unit storing rack 86. If the distance between the ends of the respective racks be less than the full movement of rack 91 as given by a full stroke of the justifying lever 93, the rack 91 will be arrested but the justifying lever will complete its full stroke owing to the spring connection 97. This prevents any strain or force being put upon the racks and their connections,—all extra pull in operating the justifying lever being taken up by the said spring.

The above-described mechanism may be termed the setting mechanism for the justifier. Its connection with the justifier proper is as follows: A connecting rod 125 connects the arm 95'', which is operated by the justifying lever 93 as described, to an arm 125ᵃ on one end of a rock-shaft 125ᵈ which is mounted in bearings upon plate 1 of the machine (see Figs. 2, 6 and 7). Upon the other end of said rock-shaft is mounted a sector gear 125ᵇ the teeth of which mesh with another sector gear 125ᵃ mounted upon a shaft 126 supported in brackets 1 depending from plate 1' of the machine. Upon the end of shaft 126 opposite sector 125ᵃ is another toothed sector 125 in mesh with a rack 120 which passes into the justification mechanism proper, as seen in Figs. 1, 21, 22 and 23. Said rack 120 is guided into the justifying mechanism above a series of slide racks 117 (Figs. 21, 22 and 23) and is formed with an edge 120' on its lower side which passes between teeth 117' on the upper surface of said slide racks (Fig. 21). The forward end of rack 120 is beveled as shown at 120ᵃ (Figs. 21 and 23) whereby in its movement across the slide racks it raises one by one a series of spring pawls 122. Pawls 122 are a series of retaining pawls corresponding to and retaining the series of slide racks 117 against the action of springs 123 which constantly tend to urge the racks forward; there being a pawl for each slide rack. The normal position of the pawls, slide racks and rack 120 is seen in Fig. 21 where the tooth of a pawl is shown in engagement with the first tooth of a slide rack. As rack 120 is moved forward, its beveled end raises pawl 122 and disengages it from the slide rack, whereupon the slide rack is impelled forward by its spring 123 until its first tooth just clears the tooth on the pawl. This slight movement of the slide rack is permitted by the slight clearance between the edge of rack 120 and the second tooth on the slide rack, as clearly shown in Fig. 21. Upon the retreat of rack 120 pawl 122 drops into the second tooth of the slide rack. It will thus be seen that pawl 122 and rack 120 act in the manner of an escapement mechanism with regard to the slide racks 117, permitting the escapement of the same one tooth at a time, as rack 120 is moved by the operation of the justifying lever 93.

Each slide rack carries at its end a spring punch 118 and die 119 mounted in jaws spaced apart sufficiently to permit the feed therethrough of the justification ribbon. Each slide rack is also provided with a lug 117ᵃ on its under side by which it may be returned to normal position in the manner hereinafter described. The slide racks are supported near their ends on and slide over bearing-pieces 120ᵇ and 120ᶜ rising from the base plate 1ᵇ. Adjacent the ends of slide racks (Figs. 21, 22) which carry the punches 118 is a plunger bar 129 of a sufficient length and width to cover all the punches throughout all their movements. In their normal position the heads of the punches are just outside the plunger bar, so that the movement of a slide rack one tooth will carry its punch beneath the plunger bar. The plunger bar is actuated by means of toggle levers 130 and 130' at each end thereof, the upper members of which are carried on a shaft 131ᵃ supported in bracket arms rising from the base plate 1ᵇ, while the lower members are attached to the ends of the plunger bar which move in guide ways in the bracket arms. The knuckle of said toggle lever is connected by a link 131 to the upper end of an arm 132 pivoted near its center in a support 133 carried by a bracket upon the base plate 1ᵇ as shown in Fig. 22. On the lower end of said lever is a cam roller maintained by a spring 132ᵇ in engagement with a cam 133 mounted upon a shaft 134 supported in bearings upon the base plate 1ᵇ. Said shaft 134 is connected by clutch connections 135, 136, hereinafter described, with beveled gears 126ᶜ, 137ᵇ, and shaft 46, which latter is provided with driving pulley (see Fig. 7) connected to the source of power.

When shaft 134 is clutched into the engagement above described, cam 133 will in its first quarter revolution swing arm 132 and thereby operate plunger bar 129 through the link and toggle connections, so that said plunger bar will depress all punches on the slide racks which have been projected beneath it. Upon the same shaft 134 is mounted another cam 141 having in engagement therewith a cam roller on one end of a rod 142ᵃ which has its other end attached to a frame 142 mounted to swing in bearings 142ᵈ on the base plate 1ᵇ (see Fig. 22). Said frame is provided with an upper bail rod 142ᵇ which is adjacent the lower sides of slide racks 117 and in position to engage the lugs 117ᵃ thereon.

The relative arrangements of cams 133 and 141 are clearly shown in Fig. 23 and are such that during the first part of the rotation of shaft 134 the punches beneath the plunger bar will be operated and during the latter part of its revolution the slides carrying those punches will be returned by means of the swing frame and its connection with cam 141, as above described.

The justification ribbon is fed through the justifier by the following mechanism: Two sprocket feed rollers 106 and 106ª are provided, each having teeth near one end and mounted on shafts journaled in suitable bearings supported upon the base plate 1ᵇ. The ribbon passes up from below through a spring tension device 106ᵈ consisting of a spring-pressed bar provided on its face with suitable friction material such as felt or billiard cloth, as shown in Fig. 22, over idle or guide sprocket roller 106ª, through the jaws of the series of slide-racks 117 and over the driving feed roll 106 and beneath a presser roll 106ʰ thereon which serves to keep the ribbon on said feed-roller and its perforations in engagement with the sprocket teeth.

Feed-roller 106 is mounted on a shaft 107 (see Figs. 23 and 23ª) carried in bearings on the base plate 1ᵇ. Said shaft 107 has a friction driving pulley 108 thereon by which it has driving connection with the source of power. The rotation of said shaft is controlled by an escapement mechanism consisting of an escapement wheel and lever 109 and 110 in a manner similar to that of the type-character ribbon feed-roller already described. The escapement lever 110 is pivoted on a stud at its lower end and is provided with a laterally extending arm 110ª to the end of which is attached a connection 110ᵇ coming from a bell-crank lever 111ª which in turn has a connection 111 attached to bell crank 111ᵇ which is actuated by the key lever of "space" key 2ᵇ (see Fig. 2). On the opposite end of shaft 107 is secured a disk 112 having near its periphery a series of holes 112', each hole corresponding to a tooth on the escapement wheel 109. Beyond this disk and loosely mounted upon the same shaft is a lantern wheel 105. The head of said lantern wheel adjacent disk 112 is provided with a pin 111' which is normally engaged in one of the holes 112' in said disk so that as shaft 107 and disk 112 are permitted to rotate by the escapement mechanism, lantern wheel 105 is carried around therewith. Mounted to slide above the lantern wheel and in engagement therewith is a rack 116 which may be defined as the "normal word space rack." The teeth of said rack engage the ribs of the lantern wheel and the rack, therefore, is moved rearwardly as said wheel rotates. Rack 116 is guided by the side of, and adjacent to, rack 120, which is the justifier rack proper. A stop 116ª projects from the side of rack 116 adjacent rack 120 and another stop 116ᵇ is provided on its upper face. Stop 116ª coöperates with rack 120 to limit its movement in a manner hereinafter described, and stop 116ᵇ limits the return of the rack when it has reached its normal or initial position by coming in contact with an abutment 116ᶜ provided for that purpose. In addition to the teeth on rack 116 which engage lantern wheel 105, said rack is provided with other teeth 116' which engage a pinion 43' (Figs. 22, 23 and 23ᵇ) mounted on a stud 113 in a support 113ª on base plate 1ᵇ. On the same stud is mounted a spring case 113'. As rack 116 is fed into the justifier by the means above described said pinion winds up the spring case 113', and upon the release of rack 116 by means hereinafter described, said spring case returns rack 116 to its initial position.

The means by which rack 116 is restored to initial position after the completion and justification of a line are as follows: A bell-crank lever 114, is pivoted on a stud on the base plate 1ᵇ of the machine (see Figs. 22, 23 and 23ª). The upper end of the vertical arm of said bell-crank lever is yoke-shaped and engages a collar on lantern wheel 105; and a spring 114' engages a stud projecting from said vertical arm whereby said arm is returned to position after operation. A lug 114" projects from the edge of said vertical arm and is arranged to be engaged by the head of a spring retaining latch 148. The horizontal arm of bell-crank lever 114 engages a sliding cam block 146. Said cam block is connected to the end of one arm of a bell-crank lever 144 by a connection 145. Bell-crank lever 144 is pivoted on a stud rising from base plate 1 and has its other arm projecting into the path of a stud 143 on cam 141. A spring 144ª is provided to return bell-crank 144 to normal position. A fork-shaped lever 149 is pivoted by its stem to the base plate of the machine, and has its upright prong extending into the path of a stud 116" on the lower side and at the end of rack 116. The other prong of lever 149 engages retaining latch 148.

By the above mechanism, when shaft 134 is clutched into engagement with driving shaft 46, and is rotated thereby, the high part of cam 141 having returned the slide racks through the connection 142ª and swing frame 142, as above described, its pin 143 strikes bell-crank 144 thereby pulling the high part of cam block 146 beneath the horizontal arm of bell-crank 114, raising the latter and throwing its vertical arm and yoke-shaped end outwardly, carrying with it lantern wheel 105. Lantern wheel 105 is thus slid along its shaft and its pin disengaged from perforated disk 112. Spring case 43' immediately returns rack 116 to its initial position. As it swings outwardly, bell-crank 114 carries lug 114" on its vertical arm behind the head of latch 148 which springs forward retaining the bell-crank in its operated condition until the rack 116 nears the end of its return movement, whereupon stud 116″ on the lower side and end thereof strikes fork-shaped lever 149 causing it to release latch 148 from lug 114″ whereupon spring 114′ causes bell-crank 114 to slide lantern wheel 105 toward the perforated disk 112 where its pin 111′ finds and enters one of the holes 112′, thus reëngaging the lantern wheel with shaft 107.

The clutch mechanism, above referred to, which connects the driving shaft 46 with the cam shaft 134 is as follows: On shaft 134 are provided two mating clutch members 135, 136 (see Figs. 21 and 22) which operate in the usual manner, member 135 being slidable on but splined to said shaft. Member 136 is fast to gear 136′ and rotates therewith. On member 135 is a stud 135ᵇ which normally engages a stop 136ᵃ on a post 136ᵇ rising from plate 1ᵇ, (Figs. 21ᶜ and 21ᵈ) being held to such engagement and against the pressure of spring 135ᵈ behind said clutch member by a pin 138, (Figs. 21ᶜ, 21ᵈ and 22) passing through said post, and against which pin said stud 135ᵇ rests. Said pin 138 has connection through bell-crank levers 139ᵃ, 139ᵇ, connection 139, and bell-crank 139ᶜ with the "justifying" key 2ᵉ (see Figs. 1, 2, 4, 21 and 22). Upon the part of post 136ᵇ which extends below the clutch member 135 is a cam projection 136ᶜ in position to engage stud 135″ during the last portion of its rotation and thereby return said member to disengaged position until it comes in contact with stop 136ᵃ and is held disengaged by pin 138.

The justifying mechanism having been described, the entire operation of the same may be described as follows: It will be understood that upon the completion of every word, excepting at the end of a line, the "space" key 2ᵃ in the keyboard is struck. This projects a stop pin to arrest the carriage so that on the next key stroke a perforation representing a normal word-space will be made in the type-character or main controller strip. In addition to this the operation of the space-key, through its connections 111, 111ᵃ and 110ᵇ operates escapement lever 110 thereby causing the justifying ribbon to be fed forward one sprocket hole and word space rack 116 to be moved backward, by means of the lantern wheel, an amount equal to the width of one rack-slide. In the practical operation of the machine a word-space mark or perforation is made at the commencement of a line. This performs a useful function in the typographic apparatus and is availed of in the present machine, as follows: As above explained, the operation of the space-key moves word-space rack 116 into the justifier an amount equal to the width of one slide-rack. The initial or normal position of the word-space rack 116 is such that the operation of the space-key at the beginning of every line will carry stop 116ᵃ of the rack 116 even with the first slide-rack of the justifier, so that, when the first word-space in the matter being composed occurs, the operation of the space-key will carry the stop of the word-space rack 116 over the first slide-rack, exposing said slide. Every operation of the space-key thereafter for that line will carry the stop 116ᵃ over and expose another slide-rack, so that the number of slide-racks passed over or exposed will represent the number of word-spaces in a line. Thus when rack bar 120 is later advanced, it can come into operative relation with each of the slides 117 past which the stop 116ᵃ has receded to advance them into position to perforate the controller, if the condition or position of the unit storing mechanism gives that much movement to rack 120.

The initial movement of the word-space rack 116 above referred to, occasioned by the operation of the space-key at the beginning of every line, carries the stop 116ᵃ thereon a sufficient distance away from the end of rack 120 to allow for the movement of pawl 95ᵃ from its position of rest shown in Fig. 20 into engagement with ratchet wheel 94. The movement of the pawl after engaging the ratchet wheel then moves rack 120 over the slides in the justifier. The angular distance between the teeth of the ratchet wheel is proportional to the width of one slide-rack in the justifier.

When the end of a line has been reached, the operator strikes the "line" key 2ᶠ the only effect of which is to arrest the carriage in position to add up units for last characters and to make a "line" perforation in the character ribbon which will coöperate with the typographic apparatus and cause it to recognize the end of a line. The next operation is to operate the justifying lever 93 which, in the manner above described, moves rack 91 toward unit storing rack 89 which has, during the "writing" of the line, been gradually advanced toward rack 91 by an amount corresponding to the aggregate number of units represented by the characters and word spaces in the line. In addition to moving rack 91, the operation of the justifying lever also moves rack 120 a proportional amount into the justifier.

The extent of movement of rack 120 into the justifier is limited by two stops, one being the end of unit storing rack 89 which is encountered by the end of rack 91, and the other being stop 116ᵃ on the word-space rack which is in the path of rack 120. If, in the line composed, there is needed, to fill out the line to proper justified length, a number of space units greater than the number of word-spaces in the line, rack 91 will not meet the end of rack 89 when the justifying lever is operated but will be stopped short of it by rack 120 meeting stop 116ª on the word-space rack. The return of rack 120 will release all those slide racks it has passed over so that they move forward carrying their punches beneath the plunger bar ready to be operated to punch the justification ribbon upon operation of said bar. A second movement of the justifying lever will carry rack 91 from its advanced position where it was left on the previous stroke of the justifying lever, either the whole or a part of the remaining distance toward rack 89, according to the number of units still left to be added to justify the line. If this remaining number be less than the word spaces in the line, rack 120 will be stopped by rack 91 abutting against the end of rack 89 before the end of rack 120 reaches stop 116ª. In this case rack 120 will pass over a second time some of slide racks which it passed over on its first movement, thus releasing them and permitting them to move forward another notch or tooth carrying their punches another step under the plunger bar.

It will be understood from all the foregoing that on the completion of the composition of a line on the keyboard, the distance between the end of racks 89 and 91 represents what I have heretofore termed the line difference. The distance rack 116 and its stop 116ª have receded over the punch slides 117 represents the number of word spaces among which the line difference may be distributed. The actuation of the justification lever 93 moves rack 91. The lineal travel of rack 91 before it is stopped by rack 89 represents the distribution of the line difference. The total possible movement of rack 120 is determined by and proportional to the travel of rack 91. If one travel of rack 120 over the distance permitted by rack 116 does not exhaust the line difference, rack 120 moves back and then forward a second time and so on until stopped by rack 91 meeting rack 89. In other words, the distribution of one unit each at a time to each of the punch slides 117 by rack 120 continues until the line difference between racks 89 and 91 is entirely used up.

In Fig. 29 is represented the portion of the justification strip punched to justify the first line of the sentence represented on the main ribbon shown in Fig. 28. The perforations S' on said strip are the sprocket feed perforations. Perforations j represent the justification perforations of which there are seven corresponding to the seven word spaces in that line. On the first operation of the justification lever seven slides were passed over and released one notch or tooth. This did not bring the end of rack 91 against the end of rack 89, so that a second operation of that lever was required. This carried rack 91 the remaining distance to rack 89 when it was stopped thereby at the point where rack 120 had passed over three slides. These three slides were released a second tooth or notch. When the justifier was set in operation by the actuation of the justification key on the keyboard, the plunger bar operated the punches of the slides and produced the result shown in the figure—three perforations representing the addition of two units each to three word spaces and four perforations representing the addition of one unit to four word spaces.

Figs. 29ª, 29ᵇ, 29ᶜ, 29ᵈ and 29ᵉ show perforations representing the different positions of the slide-racks to add one, two, three, four and five units respectively to each of nine word spaces.

In the case where the number of units to be added to a line to justify it are less than the number of word spaces in that line, rack 91 will be arrested by rack 89 on operation of the justifying lever before rack 120 has reached stop 116ª. Thus the number of word spaces to which the necessary units will be added to justify the line, as also the number of slide-racks passed over by rack 120, will be less than the whole number of word spaces in the line and also of the number of slide racks uncovered by stop 116ª.

The operator operates the justifying lever a sufficient number of times until the end of rack 91 is stopped by rack 89, and when this occurs, whether on the first or any subsequent operation of the lever knows that the justification for that line is complete. The spring mounting of said lever allows of its throw being always uniform so that when the rack has to be moved less than a complete throw no strain is thrown on the mechanism and no attention on the part of the operator is required to adjust his stroke to the condition of the racks.

By the machine above described a controller or composing ribbon is produced having type character, capitalizing or shift representations and other printing or typographic functions marked upon it, in the order in which they would occur in any given matter to be put into type; and there is simultaneously produced a ribbon having represented upon it the spacing and justification marks necessary to mark each line of a uniform length and containing the same number of space units. All the markings and functions being represented on the ribbons in the order in which they occur in the matter being composed and also in the order in which they occur in the typographic apparatus, the ribbons may be directly fed from the marking machine into the automatic typographic apparatus, so that both operations, (composing as well as making typographic impressions,) may be performed at the same time upon the same ribbons.

The same characters or representations occupy the same relative position in each transverse line, and thus may be easily read by placing a marked scale along its edge with the characters in their order of arrangement over any given transverse line of perforations. This will be seen on reference to Fig. 28 in which the letters and characters at the top, designate the perforations or marks in the vertical lines below them. S' represent the sprocket holes in the ribbon. Connections may thus be easily noted and made. Parts of the ribbon may be cut out and new parts inserted. A convenient ribbon severing device is provided and is shown in Figs. 2 and 5. It consists of a rack 150 mounted in rear of and adjacent the feed roller 9. In mesh with said rack is a pinion 151 having secured on the same shaft therewith a disk cutter 152. By sliding the pinion along the rack the cutter is rotated and coöperating with the edge of the rack severs the ribbon.

While the various mechanical features of the machine have been described and shown specifically in order to illustrate and explain the operation of the machine, the invention is not to be restricted to these specific details. Any suitable means for accomplishing the same results may be employed without departing from the spirit and scope of my invention.

Having thus described my invention, the following is what I claim as new therein and desire to secure by Letters Patent:—

1. A machine for producing controllers for typographic machines including in combination a series of keys, a plurality of series of stops, means traveling along said stops for making character representations in the controller and adapted to be positioned by selected stops when traveling in one direction but not when traveling in the other direction.

2. In a machine auxiliary to a typographic machine, a series of keys, intermediate mechanism, stops corresponding to the keys, a traveling punch and die carrier and means for bringing the carrier to rest at a stop determined by the depression of a key, substantially as set forth.

3. A machine for producing controllers for typographic mahines including in combination a series of finger keys, a plurality of rows of stops, a controller perforating device traveling along said stops and being positioned by a selected stop from either row of stops when traveling in one direction.

4. A machine for producing controllers for typographic machines including in combination a series of finger keys, a plurality of rows of stops actuated by said keys, a controller marker traveling along said stops and adapted to be positioned by a selected stop when traveling in one direction and means for retaining a stop in operative position after its key has been released.

5. In a machine auxiliary to a typographic machine, a series of finger keys, a series of coöperating stops, and intermediate mechanism to operate the stops upon the depression of the keys, a traveling punch and die carrier controlled by said stops, and means for restoring the stops to normal position and to release the carrier from their control, substantially as set forth.

6. In an auxiliary to a typographic machine, a series of finger keys, a series of stops, intermediate mechanism between the stops and keys for transmitting the movement of the keys to the stops, means for retaining the stops in the position to which they have been set by the keys after the keys have been released, a traveling punch and die carrier provided with mechanism to engage the stops when set by the keys and bring the carrier to rest, means for operating the punch after the carrier is at rest, means for restoring the stops to their normal position when the punch is actuated, means to retain the carrier at rest after the engaging stop has been withdrawn, and means for releasing the carrier on the retracting of the punch, substantially as set forth.

7. In a machine of the character described, a carrier having a punch and die mounted thereon, automatically operating means for imparting a uniform degree of movement to said carrier, and selectively operated means to intercept and arrest the movement of the carrier.

8. In a machine of the character described, a carrier having a punch and die mounted thereon, means to impart a uniform reciprocating movement to said carrier, and a series of key controlled stops adapted to be projected into the path of the carrier to intercept its movement in either direction.

9. In a machine of the character described, a carrier having a punch and die mounted thereon, means to impart a uniform degree of movement to said carrier, a key-board mechanism, and stops operated by the keys to intercept the movement of the carrier.

10. In a machine of the character described, means for receiving a blank controller strip, a carrier having a punch and die mounted thereon, automatically operating means for imparting a traveling movement to the carrier transversely of the strip, and means to cause said carrier to rest at predetermined points in its travel.

11. In a machine of the character described, means for receiving a blank controller strip, a carrier having a punch and die mounted thereon, and means for imparting a variable and intermittent movement to the carrier transversely of the strip.

12. In a machine auxiliary to a typographic machine, a traveling punch and die, a series of movable stops, means to actuate the stops to bring them severally into operative position to stop the punch and die, and means to restore said stops to normal positions, substantially as set forth.

13. The combination with a series of stop pins, and keys for actuating the same, of a punch and die carrier traversing said series of pins and provided with means for engaging the actuated stop pins to arrest the carrier, and with means for returning the actuated stop pins to normal position.

14. In a machine of the character described, a carrier having a punch and die mounted thereon, automatically operating means for giving the carrier a reciprocating movement, means for bringing the carrier to rest at predetermined points in its path of movement, and means for automatically operating the punch when the carrier is brought to rest.

15. In a machine auxiliary to a typographic machine, a series of stops, means for actuating the same, a reciprocating punch and die carrier, the movement of which may be interrupted by the projection of said stops into the path of its travel, substantially as set forth.

16. A machine for producing controllers for typographic machines including in combination two series of stop pins, keys for actuating same, a controller marker traveling both said series of pins and provided with means for engaging the actuated pins of either row while traveling in one direction.

17. In a machine of the class described, a reciprocating punch carrier, two rows of pins adjacent the path of said carrier, means to project said pins into the path of the carrier to arrest the same, means on the carrier to engage projected stop pins in one row and to pass over projected stop pins in the other row when said carrier is moving in one direction.

18. In a machine of the class described, a reciprocating punch carrier, two rows of pins adjacent the path of said carrier, means to project said pins into the path of the carrier to arrest the same, means on the carrier to engage projected stop pins in one row and to pass over projected stop pins in the other row when said carrier is moving in one direction, and means on said carrier to return the stop pins in succession after being arrested thereby.

19. A machine for producing controllers for typographic machines including in combination a keyboard, a series of stops corresponding thereto, a series of connections between the keys and stops, a traveling controller marker adapted to engage said stop pins, and means for preventing the repeated projection of a stop pin while said marker is at rest.

20. In a machine of the character described, a keyboard, a series of stop-pins corresponding to the keys of the keyboard, a series of push rods for said series of stop pins, and actuated by the keys to project said stop pins, a traveling punch carrier having means thereon to engage projected stop pins, means on said carrier to obstruct a repeated projection of a stop pin while the carrier remains at rest.

21. In a machine of the character described, the combination with series of stop pins, keys for actuating the same, and a series of intermediate rods, of a punch carrier traversing said series of pins, and provided with means for engaging the same when actuated, to arrest the carrier, and with means for restoring the stop pins, each intermediate rod being provided with a spring device, adapted to engage the corresponding stop pin, and the carrier being provided with a spring pawl, adapted to spring out over the stop pin when the latter is restored, and hold it in restored position to allow the carrier to pass the stop pin, and the stop pin to return to actuated position behind the carrier for the purpose set forth.

22. In a machine of the character described, a carrier having a punch and die mounted thereon, automatically operating means for giving the carrier a reciprocating movement, means for bringing the carrier to rest at predetermined points on its path of movement, means for automatically operating the punch when the carrier is brought to rest, and automatic means for releasing the carrier and permitting it to continue its movement.

23. In a machine of the character described, a keyboard, a series of stop-pins corresponding to the keys of the keyboard, a series of push rods for said series of stop-pins, and actuated by the keys to project said stop pins, a traveling punch carrier having means thereon to engage projected stop pins, means on said carrier to obstruct a repeated projection of a stop pin while the carrier remains at rest, and means on the push-rods to permit key-action when a stop-pin is obstructed.

24. In a machine auxiliary to a typographic machine, a traveling punch and die carrier, means for designating points in the travel of the carrier at which it is to be brought to rest, means for driving the carrier from the point of rest to the next designated stop, means operating upon the designation of the next stop of the carrier to actuate the punch while the carrier is at rest, substantially as set forth.

25. In a machine of the character described, a set of finger keys, a carrier having a punch and die mounted thereon, intermediate mechanism between the keys and the carrier for arresting the carrier at a point determined by the key depressed, and means for automatically actuating the punch when the carrier is arrested.

26. In a machine of the character described, the combination with a series of stop pins, and means for actuating the same, of a punch and die carrier traversing said series of pins and provided with means for engaging the same to arrest the carrier, of a punch operating device, and means operated thereby to restore the stop pins to normal position.

27. In a machine of the character described, the combination with a series of stop pins and means for actuating the same, a punch carrier traversing said pins and provided with means for engaging the same to arrest the carrier, a punch operating device, and means operated thereby to restore said pins, and a fixed rack or stop device to engage the pin restoring device, to hold the carrier in position.

28. In a machine of the character described, the combination of a traveling carrier having a punch and die mounted thereon, selectively operated means for interrupting the carrier at one or a plurality of points in its travel, means automatically operating when the carrier is brought to rest for actuating the punch, means for holding the material to be punched between the punch and die, and means for feeding the material to be punched transversely of the travel of the carrier upon each return of the carrier to its initial position, substantially as described.

29. In a machine of the character described, a traveling carrier having a punch and die mounted thereon, means for holding the material to be punched between the punch and die, means for feeding the material to be punched transversely of the travel of the punch and die, means for operating the punch to perforate the material to determine the length of the lines of printed matter represented by the perforations, in combination with means for separately representing the justification of the printed lines.

30. In a machine of the character described, a carrier having a punch and die mounted thereon, fluid pressure mechanism for driving the carrier, and means arranged in the path of the carrier for controlling the fluid pressure.

31. In a machine of the character described, the combination with a series of stop pins, of a punch and die carrier traversing the same, means to move the carrier by fluid pressure, and means controlled by the reciprocation of the carrier to reverse the pressure at each end of the stroke.

32. In a machine of the character described, a traveling punch and die, and means for actuating the same by fluid pressure, and an auxiliary device operated by fluid pressure, for changing the direction of the travel of the punch and die, substantially as set forth.

33. In a machine of the character described, a traveling punch and die, means for operating the same by fluid pressure, an auxiliary device actuated by fluid pressure for changing the direction of travel of the punch and die, and means for mechanically bringing the auxiliary device into action, substantially as set forth.

34. In a machine of the character described, means to represent typographic characters, a series of stop devices corresponding to the character to be represented, means coöperating with said stop devices to determine the space-unit value of each character represented, and counting devices upon which the sum of the space-unit values are added and stored and justifying devices, said counting and justifying devices being constructed and arranged to coöperate to automatically justify the line.

35. In a machine of the character described, means to represent typographic characters, stop-devices corresponding to the typographic characters, measuring devices coöperating with the stop-devices to measure the space-unit value of each character, a space-unit counter, means to engage and disengage the measuring devices and the unit counter, and means to actuate the unit counter and justifying mechanism coöperating with the said space-unit counter.

36. In a machine of the character described, the combination of a unit counting wheel having two series of corresponding holes, a detent device carrying a pin normally engaging with one series of holes, a loosely-mounted device carrying a pin adapted to engage in the other series of holes, means for engaging the two pin carrying devices alternately with the unit counting wheel, means for limiting the movement of the loosely-mounted device according to the number of units to be counted, and means for driving the unit counting wheel.

37. In a machine of the character described, means to represent typographic characters, means to measure the unit-values of characters represented, a unit counting wheel, means for propelling said wheel in one direction by amounts corresponding to the units required for the represented characters, a device loosely mounted in regard to said wheel, so as to be capable of independent rotation, means for connecting said device to the wheel so as to advance it with the movement of the wheel, means for releasing said device from its engagement with the wheel, means for returning the said device to initial position when so released, and means to sum or store the units counted.

38. In a machine of the character described, the combination of a progressively moving unit-counting device, a unit adding or storing device, connections between the two said devices comprising a lost motion connection, permitting a definite amount of idle movement of the unit counting device, substantially as set forth.

39. In a machine auxiliary to a typographic machine, means for making in a composing ribbon perforations representing characters employed in the composition, automatic means for representing a shift or change of type face on said ribbon without changing the character representations, so that the same character representation may represent a plurality of characters or functions.

40. In a machine of the character described, a unit counting device, a gage coöperating therewith to determine the space-unit value for each of the typographic characters employed, said gage having a plurality of faces representing a plurality of different type-faces, means to retain one of said gage faces normally in operative position, means to move another gage face into operative position when a different type-face character is to be represented, and means to return automatically the space gage to normal position when the normal type-face representations are resumed.

41. In a machine of the character described, a unit counting device, a bar co-operating therewith and containing variable steps or notches representing the variable widths of the lower case letters and characters, and means for changing the position of the bar with relation to the coöperating mechanism, so as to bring into operation a face having steps or notches representing the width of the upper case letters and characters, or letters and characters, some, or all of which differ from those of the lower case, substantially as set forth.

42. In a machine of the character described, a unit gage having steps or notches representing the unit-value of the typographic characters and normal spaces employed, a traveling carrier having an interponent connected therewith traversing said unit gage, means to arrest said carrier in positions corresponding to the several typographic characters, and means to move the interponent when the carrier is arrested into engagement with the step or notch of the gage which represents the unit-value of the character corresponding to the arrested position of the carrier.

43. In a machine for making representations in, or upon a composing ribbon or controller for use in a typographic machine employing letters and characters of varying widths, a bar provided with notches or steps of various depths, corresponding to the various widths of the letters and characters to be employed, and mechanism coöperating with said bar, after a certain number of representations have been made to position a stop, to designate a line of print of the normal, or less than the normal length, substantially as set forth.

44. In a machine of the character described, a unit-storing rack and a justification mechanism and setting means for said justification mechanism coöperating with said unit-storing rack, said setting means being limited in its movement by the amount of justification required, manual operating means for said setting means and having flexible connection therewith to permit of a uniform movement of the manual operating means whatever the amount of setting required.

45. In a machine of the character described, means to count and means to store the units of the characters and normal spaces comprised in a line of typographic matter, a justification mechanism to represent the justification spaces required to fill out a line, manually operated setting means for said justification mechanism, the manual operation of which is uniform for all conditions of justification, and means for recording character representations in one controller member and justification representations in another controller member.

46. In a machine of the character described, a mechanism for making justification representations, setting means for said justification mechanism, a hand lever for actuating said setting means, a spring connection between said lever and the setting means, whereby the movement given to the lever is always uniform whatever the amount of setting required.

47. In a machine of the character described, mechanism for making justification representations, a slide provided with a stop coöperating with said justification mechanism, means to actuate said slide at each representation of a normal word-space, setting means for the justification mechanism comprising a sliding rack having a movement limited by the stop on said slide, and means controlled by said sliding rack to make the justification representations.

48. In a machine of the class described, the herein-described mechanism for forming separate controllers for a typographic machine, comprising means to perforate one controller for the characters and normal word spaces, and means to perforate the other controller with representations to govern the typographic machine to produce lines of uniform length.

49. A machine of the class described, comprising coöperating mechanisms for perforating a controller strip or ribbon to represent characters and word spaces and to perforate a separate strip for justification.

50. A machine of the character described, comprising mechanism to form a controller with representations of characters and word spaces, and mechanism controlled by said first-named mechanism, to form a separate controller with representations for justification.

51. In a machine of the character described, a series of punch and die carriers, and means for positioning said carriers, and key-board controlled means for varying the positions of the different carriers, substantially as set forth.

52. In a machine of the character described, a series of independent punch and die carriers, key-board controlled means to bring said carriers into operative position, means to actuate simultaneously the punches brought into operative position, and means to feed the perforated material a distance, corresponding to the number of perforations made, substantially as set forth.

53. In a machine of the character described, a series of independent punch and die carriers, each having a punch and die, key-board controlled means for severally positioning the carriers, and means for simultaneously actuating the punches of all positioned carriers, substantially as set forth.

54. In a machine of the character described, a series of punch and die carriers, means to move the same into operative position, and key-board controlled means to vary the position of the several carriers, and means to operate simultaneously the several punches, when moved from normal position, substantially as set forth.

55. In a machine of the character described, a series of movable slides, each having two members, one member of which is perforated to form a separate die for each bar, and the other member carrying a punch to coöperate with the die, and means to feed a controller strip between the punches and dies of the series.

56. In a machine of the character described, a series of movable slides, each capable of a separate and variable movement, means to vary the movement of said slides, each slide being provided with two members, one member being perforated to form a die, and the other member carrying punches, to coöperate with the die, substantially as set forth.

57. In a machine of the character described, a movable slide having two members, one member being perforated to form a die, and the other provided with a punch adapted to coöperate with the die, for the purpose of making perforations in a suitable controller, key-board controlled mechanism for governing the operation of said member, substantially as set forth.

58. In a machine of the character described, a justification mechanism comprising a series of parallel slides, each containing a punch and die, and means for imparting to each slide an independent movement, for the purpose set forth.

59. In a machine of the character described, a justification mechanism comprising a series of slides, each slide having a punch and a die registering therewith, means to feed a ribbon or strip between the punches and dies of the series, means for adjusting each slide independently in relation to the ribbon or strip, means to select a given number of said slides, and means to actuate simultaneously the punches of the selected slides.

60. In a machine of the character described, means movable in accordance with the length of line represented on the controller, setting means coöperating with said first-named means, mechanism controlled by said setting means for marking a ribbon or strip with additional spacing representations, when the line represented on the controller is less than a predetermined standard length; said setting means rendered inoperative by the first-named means when the line represented on the controller is of the predetermined standard length.

61. In a machine of the character described, a traveling punch and die for making perforations representing characters and word spaces, and a series of punch and die carriers, each containing a single punch and die, the same being adapted to act singly or in combination, to make perforations representing the justification of a line, substantially as set forth.

62. In a machine of the character described, a unit counting device, a spring driven shaft upon which said unit counting device is mounted, and means connected with a source of power for automatically maintaining said spring in a wound condition.

63. In a machine of the character described, a unit counting wheel, a shaft upon which said wheel is mounted, a power driven shaft in line with said first named shaft, spring connection between the two shafts, and an automatic clutch device operating to keep the spring connection between the shafts in operative condition.

64. In a machine of the character described, a carrier having a punch and die mounted thereon, means for imparting a uniform degree of movement to said carrier, and selectively operated means to intercept and arrest the movement of the carrier.

65. A typographic machine including in combination means for making character representations in a controller, means for making justification representations in a separate controller, and connections between said two means for causing the justification representations to correspond with the character representations to secure justified lines of the composed matter.

66. A typographic machine including in combination means for feeding a controller, means for making character representations in the controller, means for feeding a second controller, means for making justifying representations therein corresponding to the character perforations in order to secure justified lines, and connections for feeding the controllers in harmony, and for controlling the justifying means.

67. A typographic machine including in combination means for making typographic representations in one controller representing all the characters in a composition and means coöperating therewith for making in another controller justifying representations whereby the typographic representations in the other controller are arranged in justified lines.

CHAS. T. MOORE.

Witnesses:
J. GREEN,
H. C. WORKMAN.